US011713078B2

(12) United States Patent
Miyashita et al.

(10) Patent No.: US 11,713,078 B2
(45) Date of Patent: Aug. 1, 2023

(54) WORKING VEHICLE

(71) Applicant: KUBOTA CORPORATION, Osaka (JP)

(72) Inventors: Shunsuke Miyashita, Sakai (JP); Toru Tambo, Sakai (JP); Kenichi Iwami, Sakai (JP); Hiroki Suga, Sakai (JP); Yasuaki Morioka, Sakai (JP); Kunihiko Nishino, Sakai (JP); Kumiko Kobayashi, Sakai (JP); Misako Kawai, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 231 days.

(21) Appl. No.: 17/133,698

(22) Filed: Dec. 24, 2020

(65) Prior Publication Data

US 2021/0114659 A1    Apr. 22, 2021

Related U.S. Application Data

(63) Continuation of application No. PCT/JP2018/048623, filed on Dec. 29, 2018.

(30) Foreign Application Priority Data

Jun. 25, 2018 (JP) ................................. 2018-120243
Jun. 25, 2018 (JP) ................................. 2018-120244

(Continued)

(51) Int. Cl.
*B62D 6/00* (2006.01)
*B62D 15/02* (2006.01)

(Continued)

(52) U.S. Cl.
CPC ......... *B62D 15/025* (2013.01); *B62D 15/021* (2013.01); *B60K 35/00* (2013.01); *B60K 2370/172* (2019.05)

(58) Field of Classification Search
CPC .......... A01B 69/00; B62D 6/00; B62D 15/02; B62D 15/021; B62D 15/025; B62R 16/02; G05D 1/02
See application file for complete search history.

(56) References Cited

U.S. PATENT DOCUMENTS 6,050,359 A     4/2000  Mouri et al.
6,876,920 B1 *  4/2005  Mailer ................. G05D 1/0278
                                                  701/470

(Continued)

FOREIGN PATENT DOCUMENTS

DE    198 08 100 A1    10/1998
JP    56-9008 U         1/1981

(Continued)

OTHER PUBLICATIONS

Official Communication issued in International Patent Application No. PCT/JP2018/048623, dated Mar. 12, 2019.

(Continued)

*Primary Examiner* — Tan Q Nguyen
(74) *Attorney, Agent, or Firm* — Keating and Bennett, LLP

(57) ABSTRACT

A working vehicle includes a steering device including a steering handle, a vehicle body to travel with either manual steering by the steering handle or automatic steering of the steering handle based on a traveling reference traveling line, and a controller to permit automatic steering based on steering angles of the steering device obtained when the vehicle body travels a predetermined distance while being steered by the manual steering.

18 Claims, 35 Drawing Sheets

(30) Foreign Application Priority Data

Jun. 25, 2018 (JP) ................................ 2018-120248
Jun. 25, 2018 (JP) ................................ 2018-120249

(51) Int. Cl.
*A01B 69/00* (2006.01)
*B60K 35/00* (2006.01)

(56) References Cited

U.S. PATENT DOCUMENTS

| | | | | |
|---|---|---|---|---|
| 7,451,030 B2 * | 11/2008 | Eglington | ............ | G05D 1/0221 701/410 |
| 8,131,432 B2 * | 3/2012 | Senneff | ................ | A01B 69/007 701/437 |
| 9,826,673 B1 * | 11/2017 | Ray | ...................... | A01B 69/008 |
| 10,822,031 B2 * | 11/2020 | Dix | ...................... | B62D 15/029 |
| 2003/0187577 A1 * | 10/2003 | McClure | ................ | G01C 21/00 701/50 |
| 2004/0210357 A1 * | 10/2004 | McKay | ................ | G05D 1/0278 318/587 |
| 2010/0185366 A1 * | 7/2010 | Heiniger | .............. | A01B 69/008 700/12 |
| 2011/0196565 A1 * | 8/2011 | Collins | ................ | G05D 1/0219 701/25 |
| 2015/0151786 A1 | 6/2015 | Fujii | | |

FOREIGN PATENT DOCUMENTS

| | | | | |
|---|---|---|---|---|
| JP | 63-192305 A | | 8/1988 | |
| JP | 63-240707 A | | 10/1988 | |
| JP | 05-312574 A | | 11/1993 | |
| JP | 2003-267250 A | | 9/2003 | |
| JP | 2006-337177 A | | 12/2006 | |
| JP | 2007-168592 A | | 7/2007 | |
| JP | 2015-105047 A | | 6/2015 | |
| JP | 2016-024541 A | | 2/2016 | |
| JP | 2016024541 | * | 2/2016 | ............ A01B 69/00 |
| JP | 2017-123803 A | | 7/2017 | |

OTHER PUBLICATIONS

Official Communication issued in corresponding European Patent Application No. 18924093.0, dated Oct. 4, 2022.

* cited by examiner

| Number of operations | Correction amount (cm) ||
|---|---|---|
| | Left correction amount | Right correction amount |
| 5 mm | 2 | 2 |
| 10 mm | 4 | 4 |
| 15 mm | 6 | 6 |
| 20 mm | 8 | 8 |
| 25 mm | 10 | 10 |
| ... | ... | ... |

FIG.3A

| Operation extent (Displacement) | Correction amount (cm) | |
|---|---|---|
| | Left correction amount | Right correction amount |
| 5 mm | 2 | 2 |
| 10 mm | 4 | 4 |
| 15 mm | 6 | 6 |
| 20 mm | 8 | 8 |
| 25 mm | 10 | 10 |
| ... | ... | ... |

FIG.3B

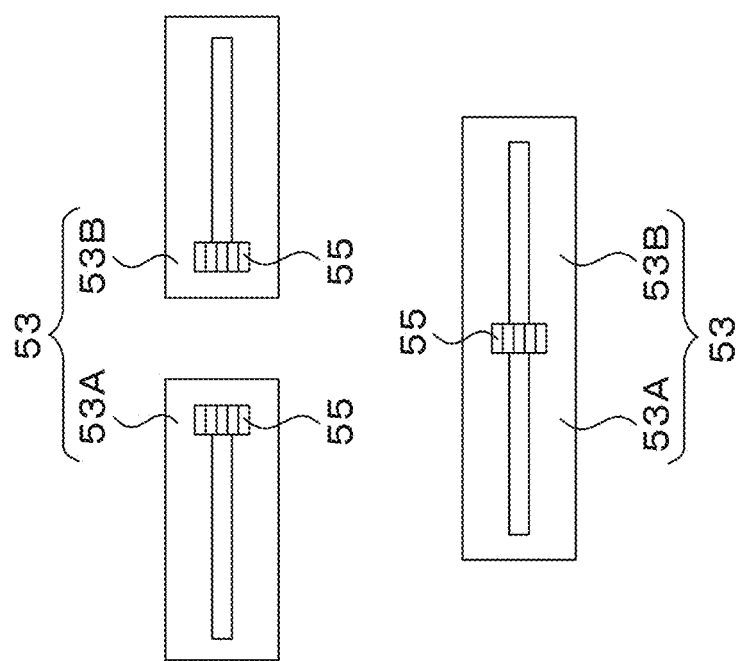

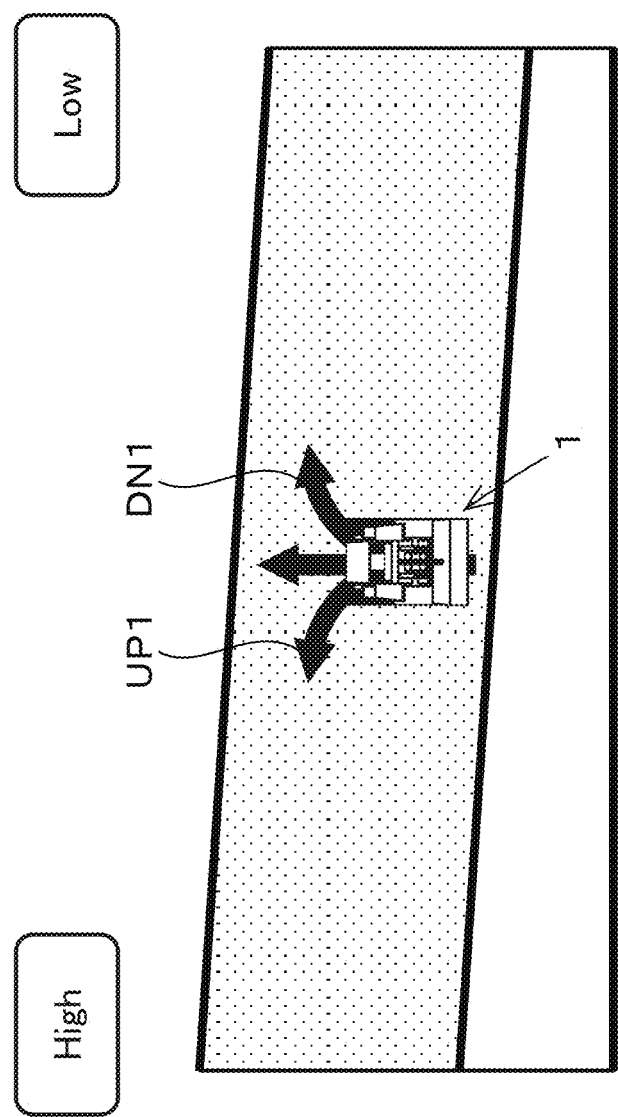

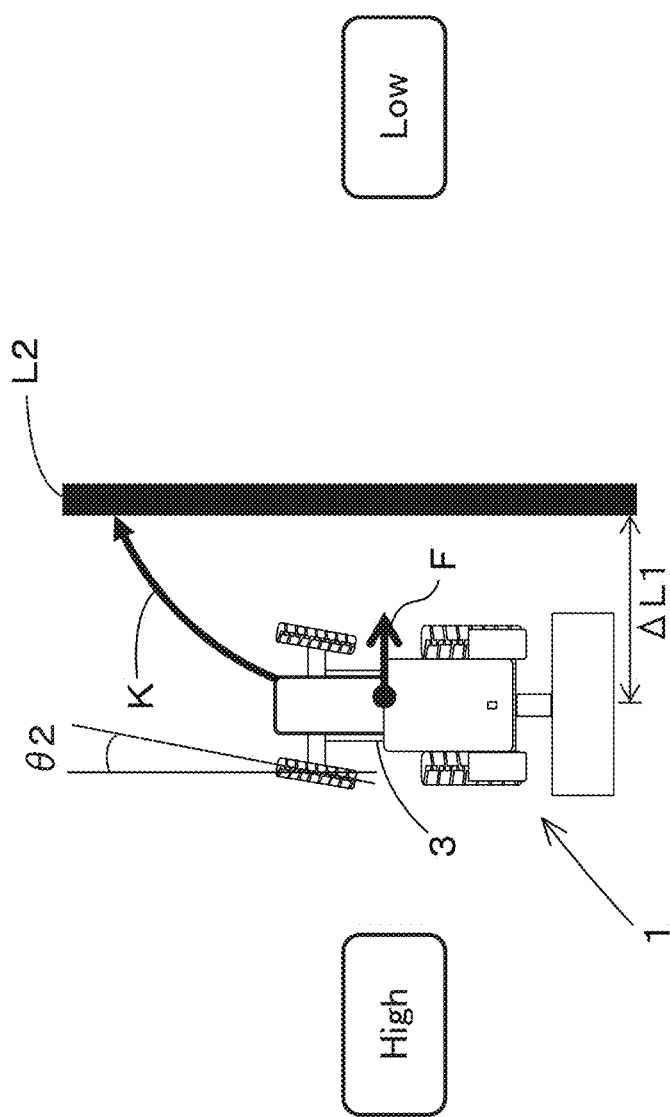

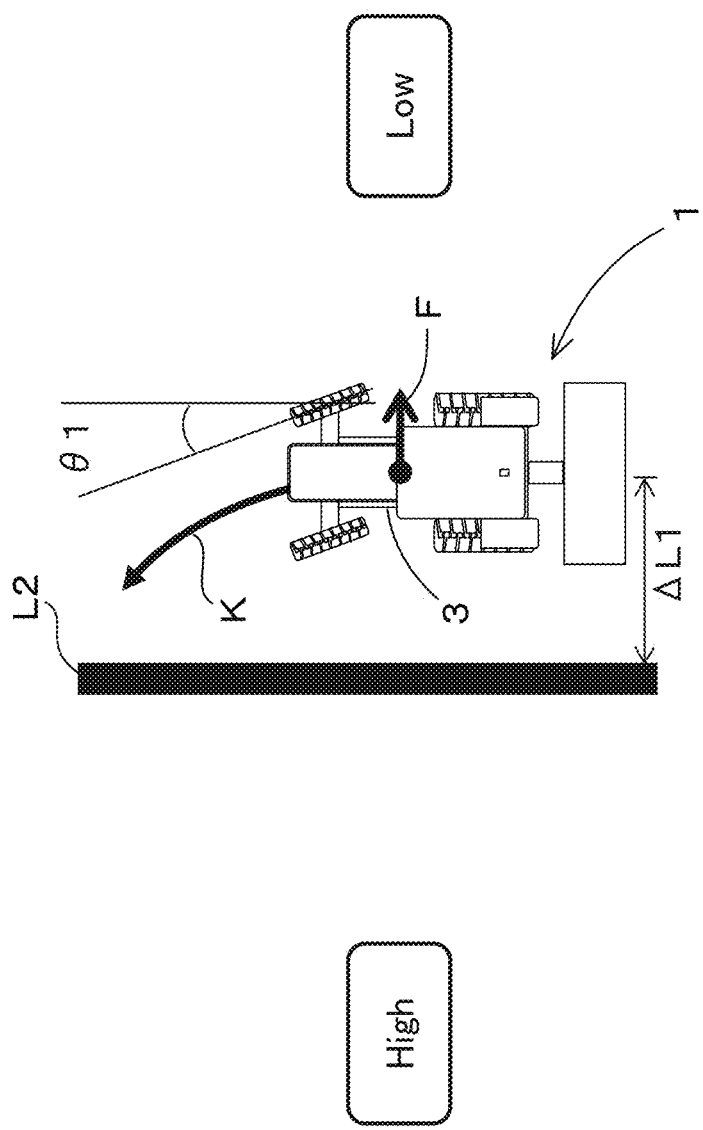

FIG.17
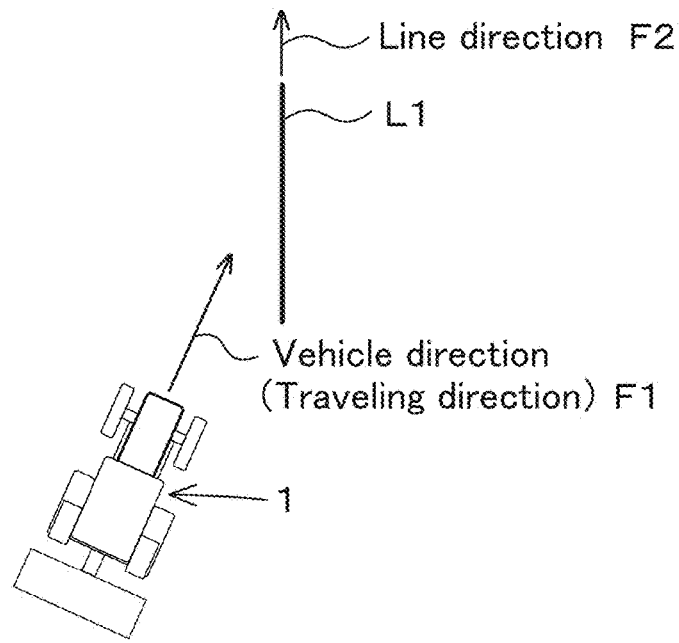
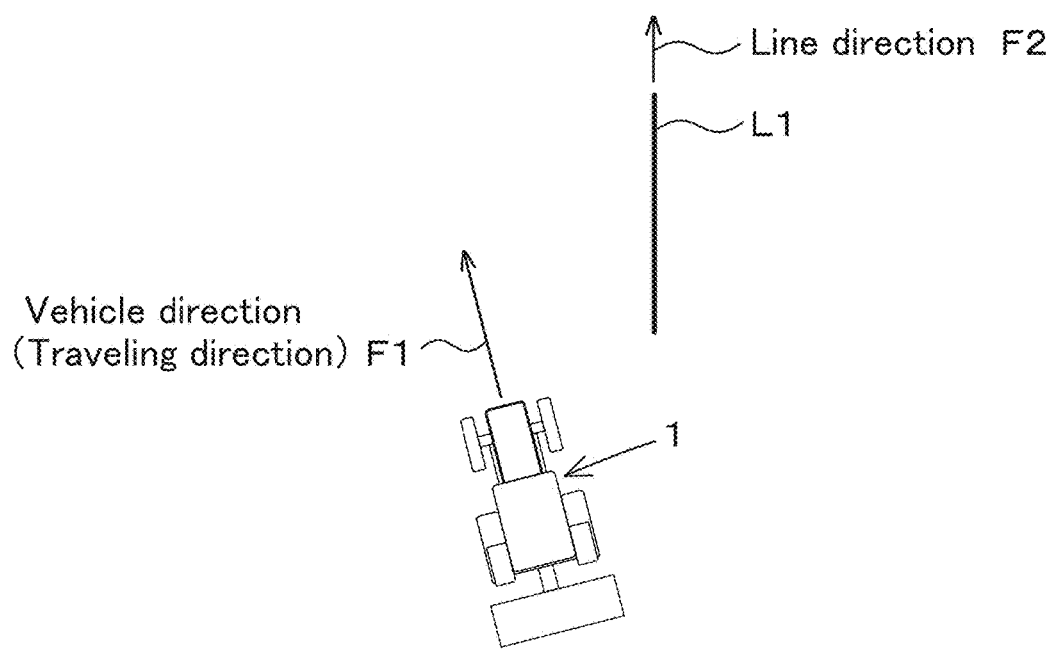

WORKING VEHICLE

CROSS REFERENCE TO RELATED APPLICATIONS

This application is a continuation application of International Application No. PCT/JP2018/048623, filed on Dec. 29, 2018, which claims the benefit of priority to Japanese Patent Application No. 2018-120243 filed on Jun. 25, 2018, Japanese Patent Application No. 2018-120244 filed on Jun. 25, 2018, Japanese Patent Application No. 2018-120248 filed on Jun. 25, 2018, and Japanese Patent Application No. 2018-120249 filed on Jun. 25, 2018. The entire contents of each of these applications are hereby incorporated herein by reference.

BACKGROUND OF THE INVENTION

1. Field of the Invention

The present invention relates to a working vehicle.

2. Description of the Related Art

Japanese Unexamined Patent Publication No. 2017-123803 is known as a conventional agricultural working machine.

The agricultural working machine of Japanese Unexamined Patent Publication No. 2017-123803 is provided with a traveling body capable of switching between manual traveling by manual steering and automatic traveling by automatic steering along a set traveling line parallel to a reference traveling line, and a changeover switch capable of switching between the manual traveling and the automatic traveling. In addition, the agricultural working machine sets a starting point of the reference traveling line after pressing a right indicator button while traveling along ridges, and sets an end point of the reference traveling line by pressing a left indicator button while traveling. That is, the reference traveling line is set before the automatic steering.

SUMMARY OF THE INVENTION

A working vehicle according to one aspect of a preferred embodiment of the present invention includes a steering device including a steering handle, a vehicle body to travel with either manual steering by the steering handle or automatic steering of the steering handle based on a traveling reference traveling line, and a controller to permit the automatic steering based on a plurality of steering angles of the steering device obtained when the vehicle body travels a predetermined distance while being steered by the manual steering.

A working vehicle includes a steering device to change an orientation of a vehicle body, an inclination detector to detect an inclination of the vehicle body, a steering angle calculator to calculate a steering angle of the steering device to reduce a deviation between a scheduled traveling line and the vehicle body based on the deviation and a predetermined parameter, a steering controller to control the steering device based on the steering angle calculated by the steering angle calculator, and a parameter corrector to correct the predetermined parameter used by the steering angle calculator based on the inclination of the vehicle body detected by the inclination detector.

A working vehicle according to another aspect of a preferred embodiment of the present invention includes a steering device including a steering handle, a vehicle body to travel with either manual steering by the steering handle or automatic steering of the steering handle based on a traveling reference traveling line, a position detector to detect an orientation of the vehicle body, an inclination detector to detect an inclination of the vehicle body, and a controller to permit the automatic steering when a difference between an orientation of the traveling reference line and an orientation of the vehicle body detected by the positioning device is within a judgment range, and perform the automatic steering by the steering device when the automatic steering is performed. The controller changes the judgment range depending on the inclination of the vehicle body detected by the inclination detector.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 3A is an explanation view explaining a correction amount in a push switch.

FIG. 3B is an explanation view explaining a correction amount in a sliding switch.

FIG. 4B is a view illustrating a first corrector portion and a second corrector portion in a sliding switch.

FIG. 14 is a view illustrating a working vehicle traveling on a slope.

FIG. 15B is a view illustrating a state where a tractor is steered to a downward direction with a parameter (a control gain) corrected.

FIG. 16A is a view illustrating a state where a tractor is steered to an upward direction without correcting a parameter (a control gain).

FIG. 17 is an explanation view of conditions of automatic steering.

DETAILED DESCRIPTION OF THE PREFERRED EMBODIMENTS

Figure 1:
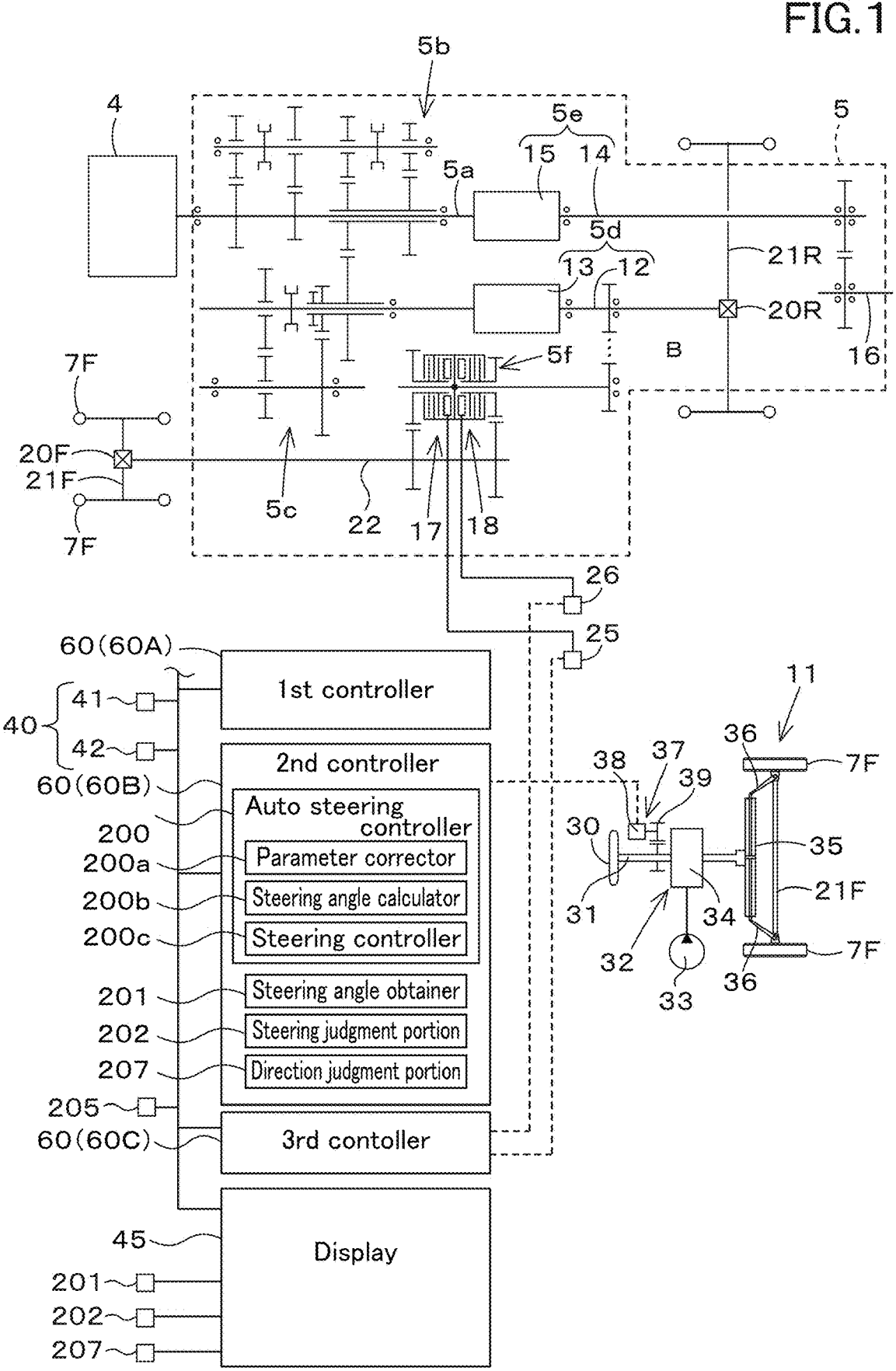
FIG. 1 is a view illustrating a control block diagram and configuration of a tractor.

The preferred embodiments will now be described with reference to the accompanying drawings, wherein like reference numerals designate corresponding or identical elements throughout the various drawings. The drawings are to be viewed in an orientation in which the reference numerals are viewed correctly.

Hereinafter, a preferred embodiment of the present invention will be described with appropriate reference to the drawings.

FIG. 1 to FIG. 13 illustrate a first preferred embodiment of the present invention.

Figure 13:
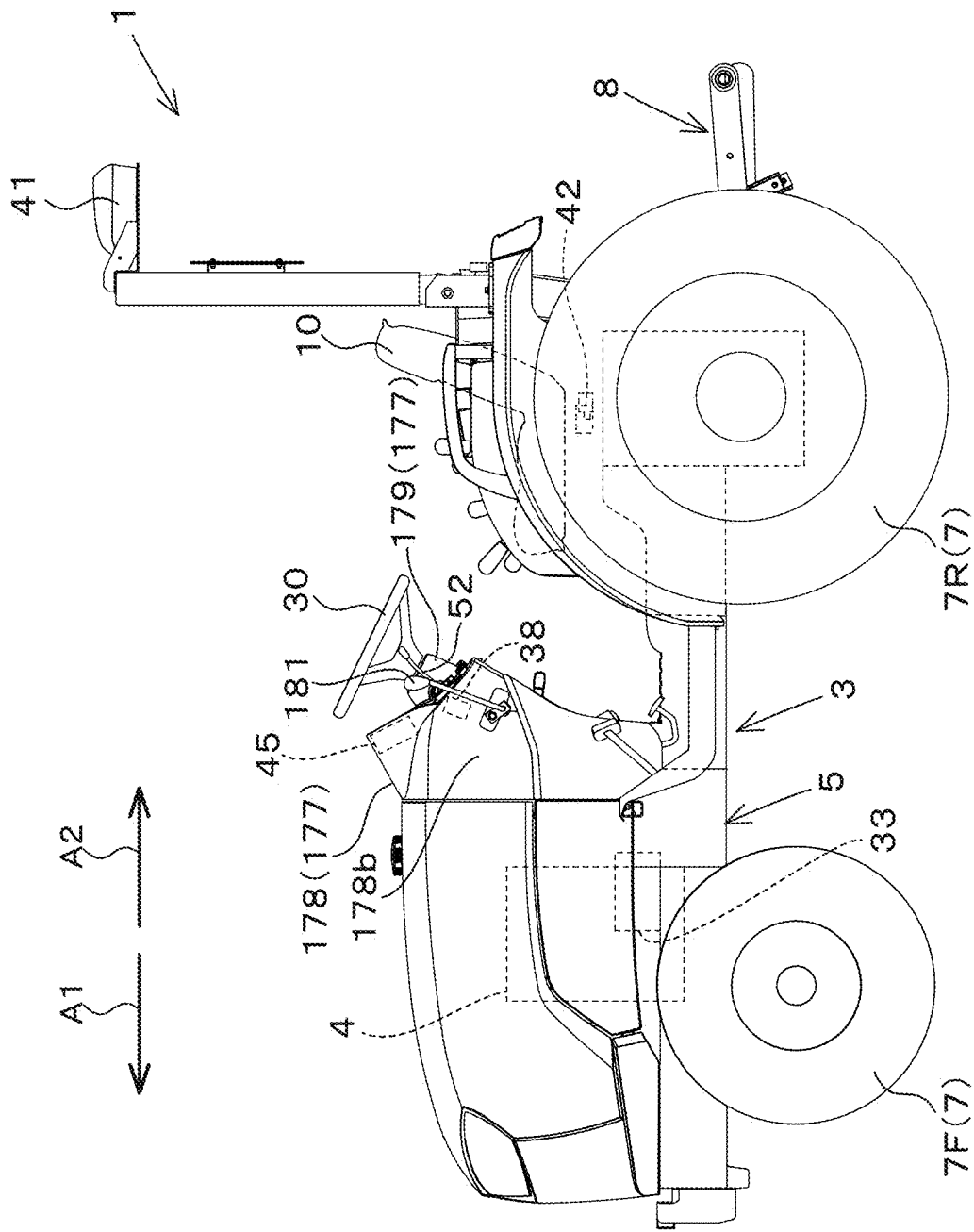
FIG. 13 is a whole view of a tractor.

FIG. 13 is a side view of the working vehicle 1, and FIG. 13 is a plan view of the working vehicle 1. In this preferred embodiment, the working vehicle 1 is a tractor. However, the working vehicle 1 is not limited to a tractor and may be an agricultural machine (agricultural vehicle) such as a combine or a transplanter, or construction equipment (construction vehicle) such as a loader working machine.

In the following description, the front side of an operator seated on an operator seat 10 of the tractor (working vehicle) 1 (a direction of an arrowed line A1 in FIG. 13) will be referred to as the front, the rear side of the operator (a direction of an arrowed line A2 in FIG. 13) will be referred to as the rear, the left side of the operator will be referred to as the left, and the right side of the operator will be referred to as the right. The horizontal direction, which is a direction orthogonal to the front-to-back direction of the working vehicle 1, is referred to as a vehicle width direction.

As shown in FIG. 13, the tractor 1 is provided with a vehicle body 3, a prime mover 4, and a speed-shifter device 5. The vehicle body 3 includes a traveling device 7, which allows the vehicle body 3 to travel. The traveling device 7 includes a front wheel 7F and a rear wheel 7R. The front wheels 7F may be tire-type or crawler-type. The rear wheels 7R also may be tire-type or crawler-type.

The prime mover 4 includes a diesel engine, an electric motor or the like, the prime mover 4 is the diesel engine in this preferred embodiment. The speed-shifter device 5 is capable of switching the propulsion of the traveling device 7 by shifting gears and also capable of switching the traveling device 7 between the forward traveling and the backward traveling. The vehicle body 3 is provided with the operator seat 10.

The rear portion of the vehicle body 3 is provided with a coupler portion 8 including a three-point linkage mechanism or the like. A working device can be attached to and detached from the coupler portion 8. By connecting the working device to the coupler portion 8, the working device can be towed by the vehicle body 3. The working device includes a cultivator device for tilling, a fertilizer sprayer device for spraying fertilizer, a pesticide sprayer device for spraying pesticides, a harvester device for harvesting, a mower device for harvesting grasses and the like, a tedder device for diffusing grasses and the like, a raking device for collecting grasses and the like, and a baler device for molding grasses and the like.

As shown in FIG. 1, the speed-shifter device 5 is provided with a main shaft (propulsion shaft) 5a, a main speed-shifter portion 5b, a sub speed-shifter portion 5c, a shuttle portion 5d, a PTO power transmission 5e, and a front speed-shifter portion 5f. The propulsion shaft 5a is rotatably supported in a housing case (transmission case) of the speed-shifter device 5, and power from the crankshaft of the prime mover 4 is transmitted to the propulsion shaft 5a. The main speed-shifter portion 5b includes a plurality of gears and a shifter to change the engagement of the gears. The main speed-shifter portion 5b changes the rotation input from the propulsion shaft 5a and outputs (shifts the speed) by changing the connection (engagement) of the plurality of gears with the shifter accordingly.

The sub speed-shifter portion 5c, like the main speed-shifter portion 5b, includes a plurality of gears and a shifter to change the engagement of the gears. By changing the connection (engagement) of the plurality of gears with the shifter as appropriate, the sub speed-shifter portion 5c changes the rotation input from the main speed-shifter portion 5b and outputs the changed rotation (speed shifting).

The shuttle portion 5d includes a shuttle shaft 12 and a forward/backward switching portion 13. The power output from the sub speed-shifter portion 5c is transmitted to the shuttle shaft 12 via gears and other devices. The forward/backward switching portion 13 includes, for example, a hydraulic clutch or the like, and switches the direction of rotation of the shuttle shaft 12, that is, the forward movement and backward movement of the tractor 1, by engaging and disengaging the hydraulic clutch. The shuttle shaft 12 is connected to a rear wheel differential device 20R. The rear wheel differential device 20R rotatably supports the rear axle 21R on which the rear wheel 7R is mounted.

The PTO power transmission 5e includes a PTO propulsion shaft 14 and a PTO clutch 15. The PTO propulsion shaft 14 is rotatably supported, and the power from the propulsion shaft 5a can be transferred from the propulsion shaft 5a. The PTO propulsion shaft 14 is connected to the PTO shaft 16 via the gears and the like. The PTO clutch 15 includes, for example, a hydraulic clutch and the like, and is switched between a state where the power of the propulsion shaft 5a is transferred to the PTO propulsion shaft 14 and a state where the power of the propulsion shaft 5a is not transferred to the PTO propulsion shaft 14.

The front speed-shifter device 5f includes a first clutch 17 and a second clutch 18. The first clutch 17 and the second clutch are capable of transmitting power from the propulsion shaft 5a, for example, the power of the shuttle shaft 12 is transmitted via the gears and the transmission shaft. The power from the first clutch 17 and the second clutch 18 can be transmitted to the front axle 21F via the front transmission shaft 22. In particular, the front transmission shaft 22 is connected to a front wheel differential device 20F, which rotatably supports the front axle 21F on which the front wheels 7F are mounted.

The first clutch 17 and the second clutch 18 include a hydraulic clutch or the like. A fluid line is connected to the first clutch 17, and the fluid line is connected to a first actuator valve 25, to which the hydraulic fluid discharged from the hydraulic pump is supplied. The first clutch 17 is switched between a engaged state and a disengaged state depending on the degree of opening of the first actuator valve 25. A fluid line is connected to the second clutch 18, and the fluid line is connected to a second actuator valve 26. The second clutch 18 is switched between an engaged state and a disengaged state depending on the degree of opening of the second actuator valve 26. The first and second actuation valves 25 and 26 are, for example, two-position switching valves with solenoid valves, which are switched to an engaged state or a disengaged state by magnetization or demagnetization of the solenoid valve solenoids.

When the first clutch 17 is disengaged and the second clutch 18 is engaged, the power of the shuttle shaft 12 is transmitted to the front wheels 7F through the second clutch 18. This results in four-wheel driving (4WD) in which the front and rear wheels are driven by the power and the rotation speed of the front and rear wheels is the same or substantially the same (4WD constant speed state). On the other hand, when the first clutch 17 is engaged and the second clutch 18 is disengaged, four-wheel driving is provided and the rotation speed of the front wheel becomes higher than that of the rear wheel (4WD constant speed state). When the first and second clutches 17 and 18 are disengaged, the power of the shuttle shaft 12 is not transmitted to the front wheels 7F, and thus the vehicle becomes two-wheel drive (2WD) with the rear wheels driven by power.

The tractor 1 is provided with a positioning device 40. The positioning device 40 is capable of detecting its own position (positioning information including latitude and longitude) by a satellite positioning system (positioning satellite) such as D-GPS, GPS, GLONASS, HOKUTO, GALILEO, MICHIBIKI, and the like. That is, the positioning device 40 receives satellite signals transmitted by the positioning satellite (such as the position of the positioning satellite, transmission time, correction information, and the like) and detects its position (for example, latitude and longitude) based on the satellite signals. The positioning device 40 includes a receiver device 41 and an inertial measurement device (IMU: Inertial Measurement Unit) 42. The receiver device 41 includes an antenna or the like and receives satellite signals transmitted from a positioning satellite, and is attached to the vehicle body 3 separately from the inertial measurement unit 42. In this preferred embodiment, the receiver device 41 is attached to a ROPS provided to the vehicle body 3. The attachment location of the receiver device 41 is not limited to that of this preferred embodiment.

The inertial measurement device 42 includes an acceleration sensor to detect acceleration, a gyroscope to detect angular velocity, and so forth. The vehicle body 3, for example, is installed below the operator seat 10, and the roll angle, pitch angle, yaw angle, and the like of the vehicle body 3 can be detected by the inertial measurement device 42.

As shown in FIG. 1, the tractor 1 is provided with a steering device 11. The steering device 11 is capable of performing manual steering to steer the body of the vehicle body 3 by the operator and automatic steering to steer the body of the vehicle body 3 automatically without the operator's operation.

The steering device 11 includes a steering handle (steering wheel) 30 and a steering shaft (rotating shaft) 31 that rotatably supports the steering handle 30. The steering device 11 also includes an assist mechanism (power steering device) 32. The assist mechanism 32 assists the rotation of the steering shaft 31 (steering handle 30) by hydraulic or other means. The assist mechanism 32 includes a hydraulic pump 33, a control valve 34 to which the hydraulic fluid discharged from the hydraulic pump 33 is supplied, and a steering cylinder 35 operated by the control valve 34. The control valve 34 is, for example, a three-position switching valve that can be switched by movement of a spool or the like, and is switched in response to the steering direction (direction of rotation) of the steering shaft 31. The steering cylinder 35 is connected to an arm (knuckle arm) 36 that changes the direction of the front wheels 7F.

Thus, when the operator grasps the steering wheel 30 and operates the steering wheel 30 in one direction or the other, the switching position and opening degree of the control valve 34 will be switched according to the direction of rotation of the steering wheel 30, and the steering cylinder 35 will stretch and shorten to the left or right according to the switching position and opening degree of the control valve 34. The direction of steering of the front wheels 7F can be changed by the steering wheel 30. In other words, the vehicle body 3 can change the direction of travel to the left or right by manual steering of the steering handle 30.

Next, automatic steering will be explained.

Figure 2:
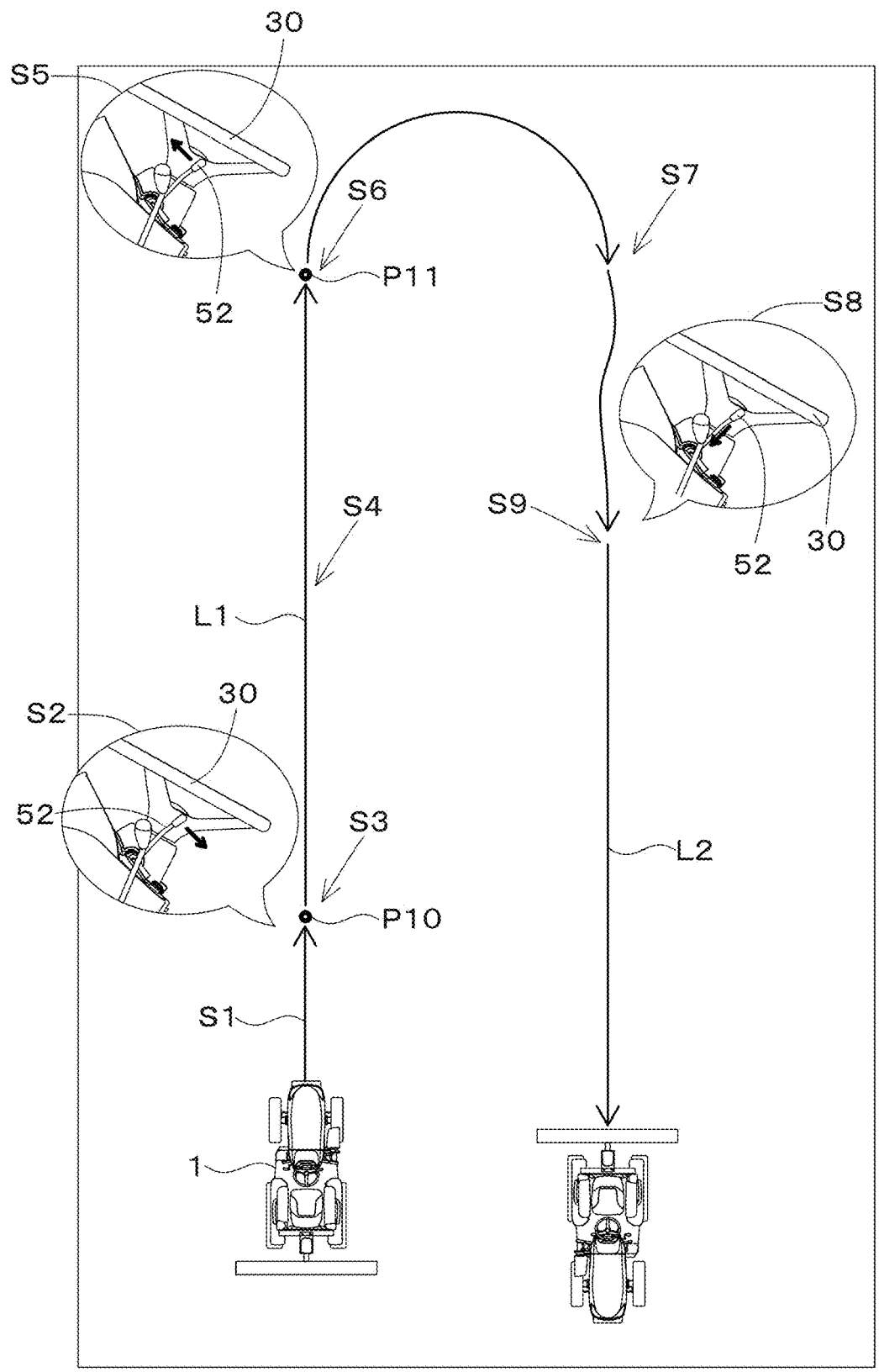
FIG. 2 is an explanation view explaining automatic steering.

As shown in FIG. 2, when automatic steering is performed, first, a traveling reference line L1 is set before automatic steering is performed. After the traveling reference line L1 is set, the automatic steering can be performed by setting the scheduled traveling line L2, which is parallel to the traveling reference line L1. The automatic steering automatically steers the tractor 1 (vehicle body 3) in the direction of traveling so that the vehicle position measured by the positioning device 40 and the scheduled traveling line L2 coincide.

In particular, when the tractor 1 (vehicle body 3) is moved to a predetermined position in the field prior to the automatic steering (S1), and at the predetermined position, the operator operates the steering changeover switch 52 provided on the tractor 1 (step S2), the vehicle position measured by the positioning device 40 is set at the start point P10 of the traveling reference line L1 (step S3). When the tractor 1 (vehicle body 3) is moved from the start point P10 of the traveling reference line L1 (step S4) and the operator operates the steering changeover switch 52 at the predetermined position (step S5), the vehicle position measured by the positioning device 40 is set at the end point P11 of the traveling reference line L1 (step S6). Thus, a straight line connecting the start point P10 and the end point P11 is set as the traveling reference line L1.

After setting the traveling reference line L1 (after step S6), for example, when the tractor 1 (vehicle body 3) is moved to a different location than where the traveling reference line L1 was set (step S7) and the operator operates the steering changeover switch 52 (step S8), the scheduled traveling line L2, which is a straight line parallel or substantially parallel to the traveling reference line L1, is set (step S9). After the scheduled traveling line L2 is set, the automatic steering is started and the direction of traveling of the tractor 1 (vehicle body 3) is changed so that it follows the scheduled traveling line L2. For example, when the current vehicle position is on the left side of the scheduled traveling line L2, the front wheel 7F is steered to the right, and when the current vehicle position is on the right side of the scheduled traveling line L2, the front wheel 7F is steered to the left. During the automatic steering, the travel speed (vehicle speed) of the tractor 1 (vehicle body 3) can be changed by the operator manually changing the amount of operation of the gas pedal members (accelerator pedal and gas pedal lever) provided in the tractor 1, or by changing the gear shift of the speed shifter (transmission).

After the start of the automatic steering, the automatic steering can be terminated when the operator operates the steering changeover switch 52 at any point. That is, the end point of the scheduled traveling line L2 can be set by the end of the automatic steering by operating the steering changeover switch 52. In other words, the length of the end point of the scheduled traveling line L2 can be set longer or shorter than the traveling reference line L1. In other words, the scheduled traveling line L2 is not associated with the length of the traveling reference line L1, and the scheduled traveling line L2 allows the vehicle to travel a longer distance than the length of the traveling reference line L1 under the automatic steering.

As shown in FIG. 1, the steering device 11 includes an automatic steering mechanism 37. The automatic steering mechanism performs automatic steering of the vehicle body 3 and automatically steers the vehicle body 3 based on the position of the vehicle body 3 (vehicle position) detected by the positioning device 40. The automatic steering mechanism 37 is provided with a steering motor 38 and a gear mechanism 39. The steering motor is a motor whose rotational direction, rotational speed, rotational angle, and the like can be controlled based on the vehicle position. The gear mechanism 39 includes a gear provided on the steering shaft 31 and traveling in conjunction with the steering shaft 31, and a gear provided on the rotation shaft of the steering motor 38 and traveling in conjunction with the rotation shaft of the steering motor 38. When the rotation shaft of the steering motor 38 rotates, the steering shaft 31 automatically rotates (revolves) via the gear mechanism 39 to change the steering direction of the front wheels 7F so that the vehicle position coincides with the scheduled traveling line L2.

As shown in FIG. 1, the tractor 1 is provided with a display device 45. The display device 45 is capable of displaying various information about the tractor 1, at least the operation information of the tractor 1. The display device 45 is located in front of the operator seat 10.

As shown in FIG. 1, the tractor 1 is provided with a setter switch 51. The setter switch 51 is a switch that switches to a setting mode that is set at least prior to the start of the automatic steering. The setting mode is a mode for making various settings related to the automatic steering before starting the automatic steering, for example, setting a start and end point of the traveling reference line L1.

The setter switch 51 is switchable to ON or OFF, and outputs a signal that the setting mode is enabled when it is ON, and outputs a signal that the setting mode is disabled when it is OFF. The setter switch 51 also outputs a signal to the display device 45 that the setting mode is enabled when it is ON, and outputs a signal to the display device 45 that the setting mode is disabled when it is OFF.

The tractor 1 is provided with the steering changeover switch 52. The steering changeover switch 52 switches the start or end of the automatic steering. In particular, the steering changeover switch 52 is switchable from the neutral position to up, down, forward, or backward, and issues a start of the automatic steering when switched downward from the neutral position with the setting mode enabled, and issues an end of the automatic steering when switched upward from the neutral position with the setting mode enabled. The steering changeover switch 52 also issues to set the current vehicle position to the start point P10 of the traveling reference line L1 when switched from the neutral position to the rear with the setting mode enabled, and the steering changeover switch 52 issues to set the current vehicle position to the end point P11 of the traveling reference line L1 when switched from the neutral position to the front with the setting mode enabled. That is, the steering changeover switch 52 defines and functions as both of a traveling reference line setter which for setting the start position (start point P10) of the traveling reference line L1 and a traveling reference line setter which for setting the end position (end point P11) of the traveling reference line L1. The steering changeover switch 52 may be configured separately from the traveling reference line setter switch and the steering changeover switch 52, which switches the start or end of the automatic steering.

The tractor 1 is provided with a corrector switch 53. The corrector switch 53 corrects the vehicle position (latitude and longitude) measured by the positioning device 40. That is, the corrector switch 53 corrects the vehicle position (called the calculated vehicle position) calculated with the satellite signal (position of the positioning satellite, transmission time, correction information, and the like) and the measurement information (acceleration, angular velocity) measured by the inertial measurement device 42.

The corrector switch 53 includes a push switch or a slide switch, which can be pressed or slidable. Hereinafter, a case in which the corrector switch 53 is a push switch and a case in which the corrector switch 53 is a slide switch respectively will be described.

When the corrector switch 53 is a push switch, the correction amount is set based on the number of operations of the push switch. The correction amount is determined by the following formula: correction amount=number of operations×correction amount per operation count. For example, as shown in FIG. 3A, each operation of the push switch increases the amount of correction by a few centimeters or tens of centimeters. The number of operations of the push switch is input to the first controller device 60A, and the first controller device 60A sets (calculates) the correction amount based on the number of operations.

When the corrector switch 53 is a slide switch, the amount of correction is set based on the amount of operation (displacement amount) of the slide switch. For example, the correction amount is determined by the correction amount=the amount of displacement from a predetermined position. For example, as shown in FIG. 3B, for every 5 mm increase in the displacement of the slide switch, the amount of correction is increased by a few centimeters or tens of centimeters. The amount of operation of the slide switch (displacement amount) is input to the first controller device 60A, and the first controller device 60A sets (calculates) the correction amount based on the displacement amount. The method of increasing the correction amount and the rate of increase is not limited to the values described above.

Figure 4A:
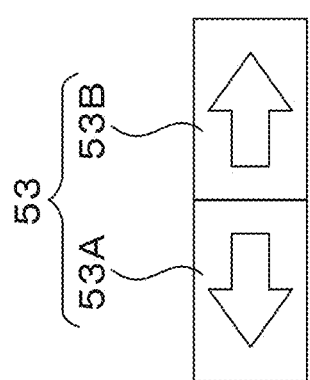
FIG. 4A is a view illustrating a first corrector portion and a second corrector portion in a push switch.

In detail, as shown in FIGS. 4A and 4B, the corrector switch 53 includes a first corrector portion 53A and a second corrector portion 53B. The first corrector portion 53A commands correction of the vehicle position corresponding to one side, that is, the left side, of the vehicle body 3 in the width direction. The second corrector portion 53B commands correction of the vehicle position corresponding to the other side in the width direction of the vehicle body 3, that is, the right side.

As shown in FIG. 4A, when the corrector switch 53 is a push switch, the first corrector portion 53A and the second corrector portion 53B are on or off switches that automatically return at each operation. The switch including the first corrector portion 53A and the switch including the second corrector portion 53B are integrated with the switch including the first corrector portion 53A. The switch including the first corrector portion 53A and the switch including the second corrector portion 53B may be disposed apart from each other. As shown in FIG. 3A, each time the first corrector portion 53A is pressed, the amount of correction corresponding to the left side of the vehicle body 3 (the left correction amount) is increased. Also, each time the second corrector portion 53B is pressed, the amount of correction corresponding to the right side of the vehicle body 3 (the right correction amount) increases.

As shown in FIG. 4B, when the corrector switch 53 is a slide switch, the first and second corrector portions 53A and 53B include a pinching portion 55 that moves left or right along the longitudinal direction of the long hole. When the corrector switch 53 is a slide switch, the first and second corrector portions 53A and 53B are spaced apart from each other in the width direction. As shown in FIG. 3B, when the pinching portion 55 is gradually displaced to the left side from the predetermined reference position, the left correction amount increases in accordance with the displacement amount. When the pinching portion 55 is gradually displaced to the right side from the predetermined reference position, the right correction amount increases in accordance with the displacement amount. As shown in FIG. 4B, in the case of a slide switch, the first corrector portion 53A and the second corrector portion 53B are integrated together, and the reference position of the pinching portion 55 is set at the center, and when the pinching portion 55 is displaced to the left from the reference position, the left correction amount is set, and when the pinching portion 55 is displaced to the right from the middle position, the right correction amount is set.

Next, the relation between the correction amount (left and right correction amounts) by the corrector switch 53, the scheduled traveling line L2, and the behavior of the tractor 1 (vehicle body 3) (traveling trajectory) will be explained.

Figure 5A:
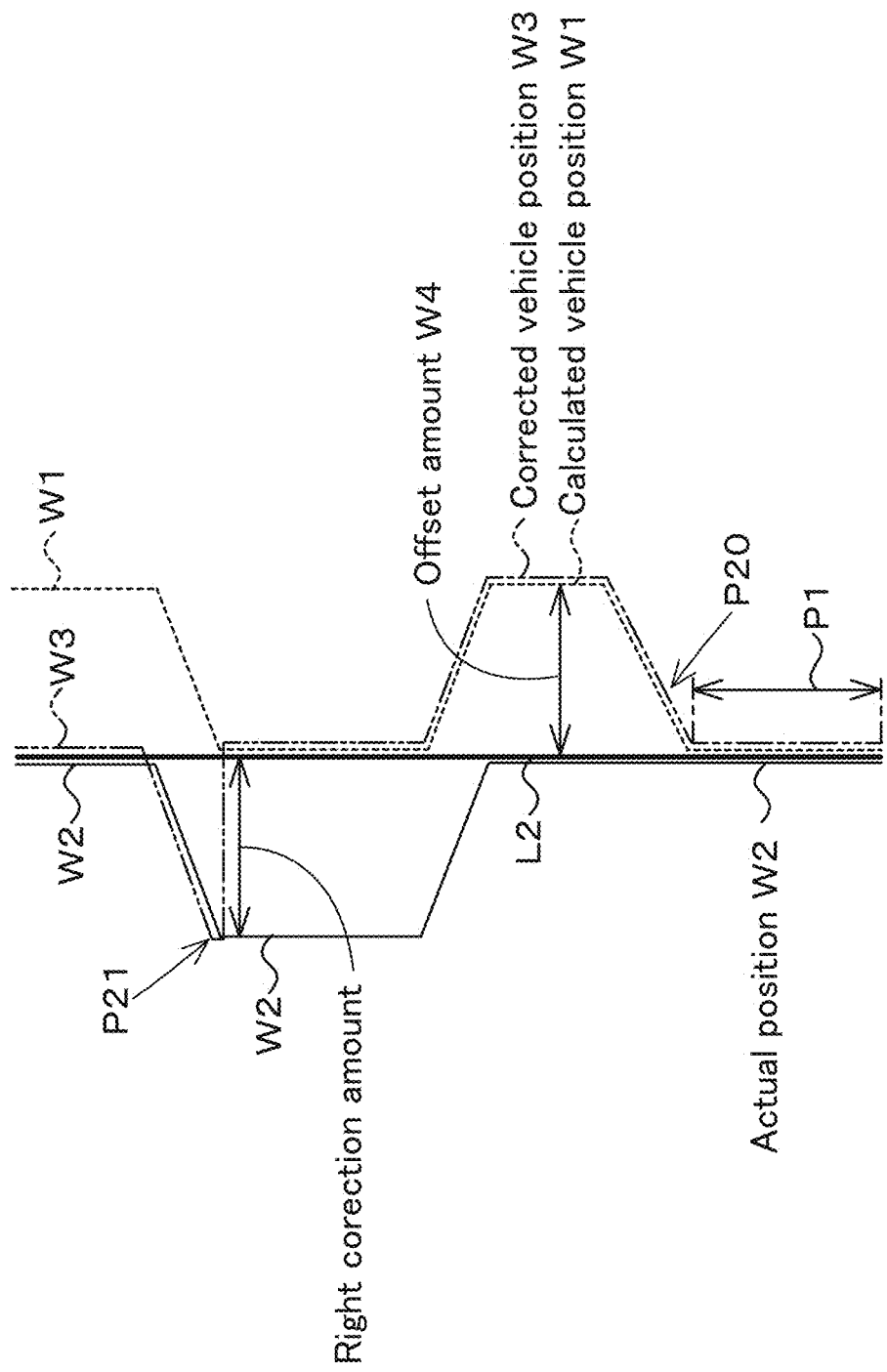
FIG. 5A is a view illustrating a state where a calculated vehicle position is offset rightward during straight traveling in automatic steering.

FIG. 5A shows the situation when the calculated vehicle position W1 shifts to the right during the automatic steering and straight ahead. As shown in FIG. 5A, when the automatic steering is started and the actual position of the tractor 1 (vehicle body 3) (actual position W2) is the same as the calculated vehicle position W1, and the actual position W2 is the same as the scheduled traveling line L2, the tractor 1 will travel along the scheduled traveling line L2. That is, in the sector P1 where there are no errors in the positioning of the positioning device 40 and the vehicle position (calculated vehicle position W1) detected by the positioning device 40 is the same as the actual position W2, the tractor 1 travels along the scheduled traveling line L2. When there are no errors in positioning by the positioning system 40 and no corrections are made, the calculated vehicle position W1 is the same as the corrected vehicle position (corrected vehicle position) W3, corrected by the correction amount. The corrected vehicle position W3 is calculated by the following formula: corrected vehicle position W3=calculated vehicle position W1−correction amount.

Here, in the vicinity of the position P20, although the actual position W2 is not out of alignment with the scheduled traveling line L2, various effects cause errors in positioning by the positioning device 40, and the vehicle position W1 detected by the positioning device 40 is shifted to the right side with respect to the scheduled traveling line L2 (actual position W2), resulting in the offset amount (gap or deviation) W4. Then, the tractor 1 judges that there is a gap between the calculated vehicle position W1 and the scheduled traveling line L2, and steers the tractor 1 to the left so that the offset amount W4 between the calculated vehicle position W1 and the scheduled traveling line L2 is eliminated. Then, the actual position W2 of the tractor 1 shifts to the scheduled traveling line L2 by steering left. Then, it is supposed that the operator notices that the tractor 1 has shifted from the scheduled traveling line L2 and steers the second corrector portion 53B at position P21 to increase the right correction amount from zero. The right-hand correction is added to the calculated vehicle position W1, and the corrected vehicle position W3 can be made to be the same or substantially the same as the actual position W2. In other words, the vehicle position of the positioning system 40 can be corrected by the second corrector portion 53B in the direction to eliminate the offset amount W4 that occurred in the vicinity of the position P20. As shown in position P21 in FIG. 5A, when the actual position W2 of the tractor 1 is far to the left of the scheduled traveling line L2 after the vehicle position correction, the tractor 1 can be steered to the right to bring the actual position W2 of the tractor 1 in line with the scheduled traveling line L2.

Figure 5B:
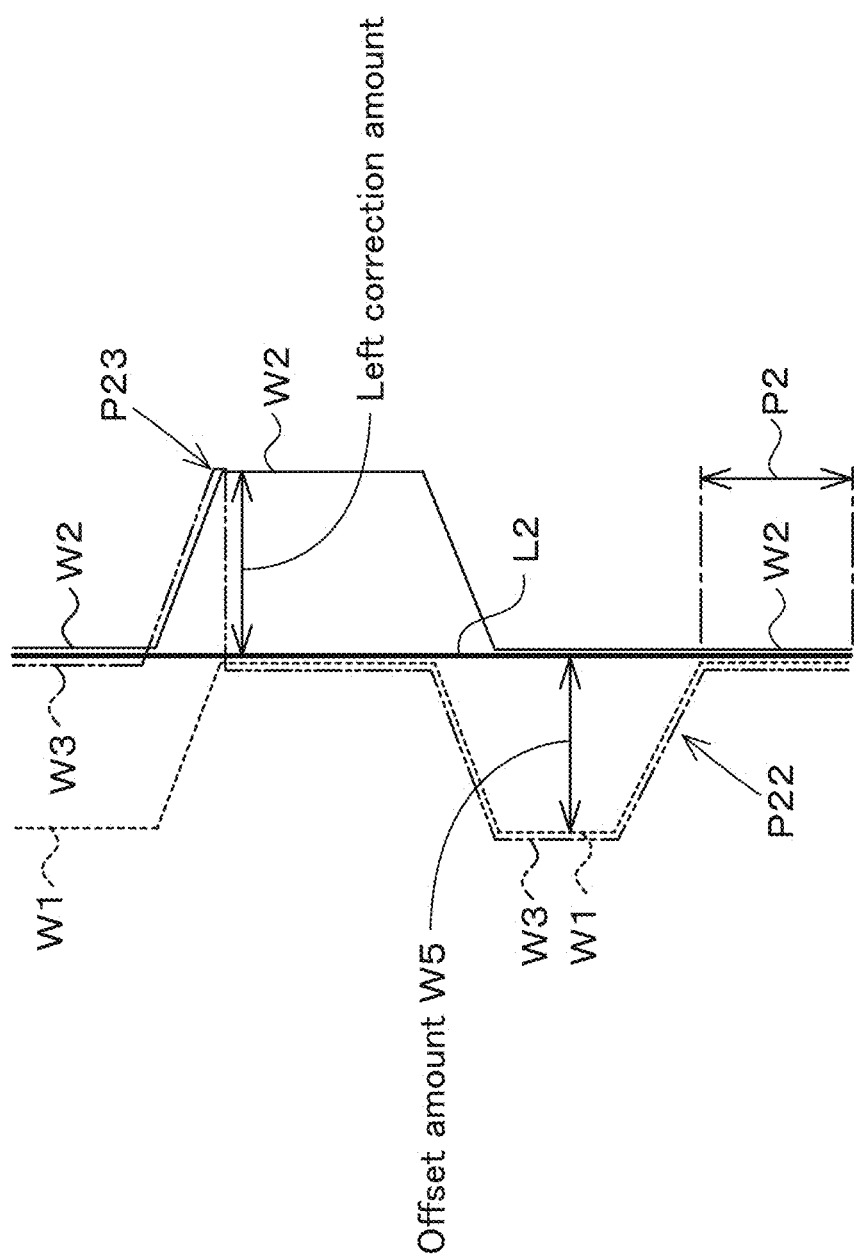
FIG. 5B is a view illustrating a state where a calculated vehicle position is offset leftward during straight traveling in automatic steering.

FIG. 5B shows a case in which the calculated vehicle position W1 shifts to the left while the vehicle is moving straight ahead during the automatic steering. As shown in FIG. 5B, when the actual position W2 and the calculated vehicle position W1 coincide with the actual position W2 and the scheduled traveling line L2 at the start of the automatic steering, as in FIG. 5A, the tractor 1 travels along the scheduled traveling line L2, as in FIG. 5A. That is, as in FIG. 5A, in the sector P2 where there is no error in the positioning of the positioning device 40, tractor 1 travels along the scheduled traveling line L2. Also, as in FIG. 5A, the calculated vehicle position W1 and the corrected body position W3 are the same value.

When, at position P22, due to various effects, there is an error in the positioning of the positioning device 40, and the vehicle position W1 detected by the positioning device 40 is shifted to the left side relative to the actual position W2, and the offset amount (gap or deviation) W5 is maintained, then the tractor 1 resolves the offset amount W5 between the calculated vehicle position W1 and the scheduled traveling line L2. The tractor 1 is steered to the right so as to do so. Then, it is determined that the operator notices that tractor 1 is out of alignment with the scheduled traveling line L2 and the operator steers the first corrector portion 53A at position P23 to increase the left correction amount from zero. Then, the left correction amount is added to the calculated vehicle position W1, and the corrected vehicle position (corrected body position) W3 can be made the same or substantially the same as the actual position W2. In other words, by setting the left correction amount using the first corrector portion 53A, the vehicle position of the positioning system 40 can be corrected in a direction that eliminates the offset amount W5 that occurred in the vicinity of position P22. As shown in position P23 in FIG. 5B, when the actual position W2 of the tractor 1 is far to the right of the scheduled traveling line L2 after the vehicle position correction, the tractor 1 can be steered to the left to bring the actual position W2 of the tractor 1 in line with the scheduled traveling line L2.

Next, the setter switch 51 and the corrector switch 53 will be described.

Figure 6:
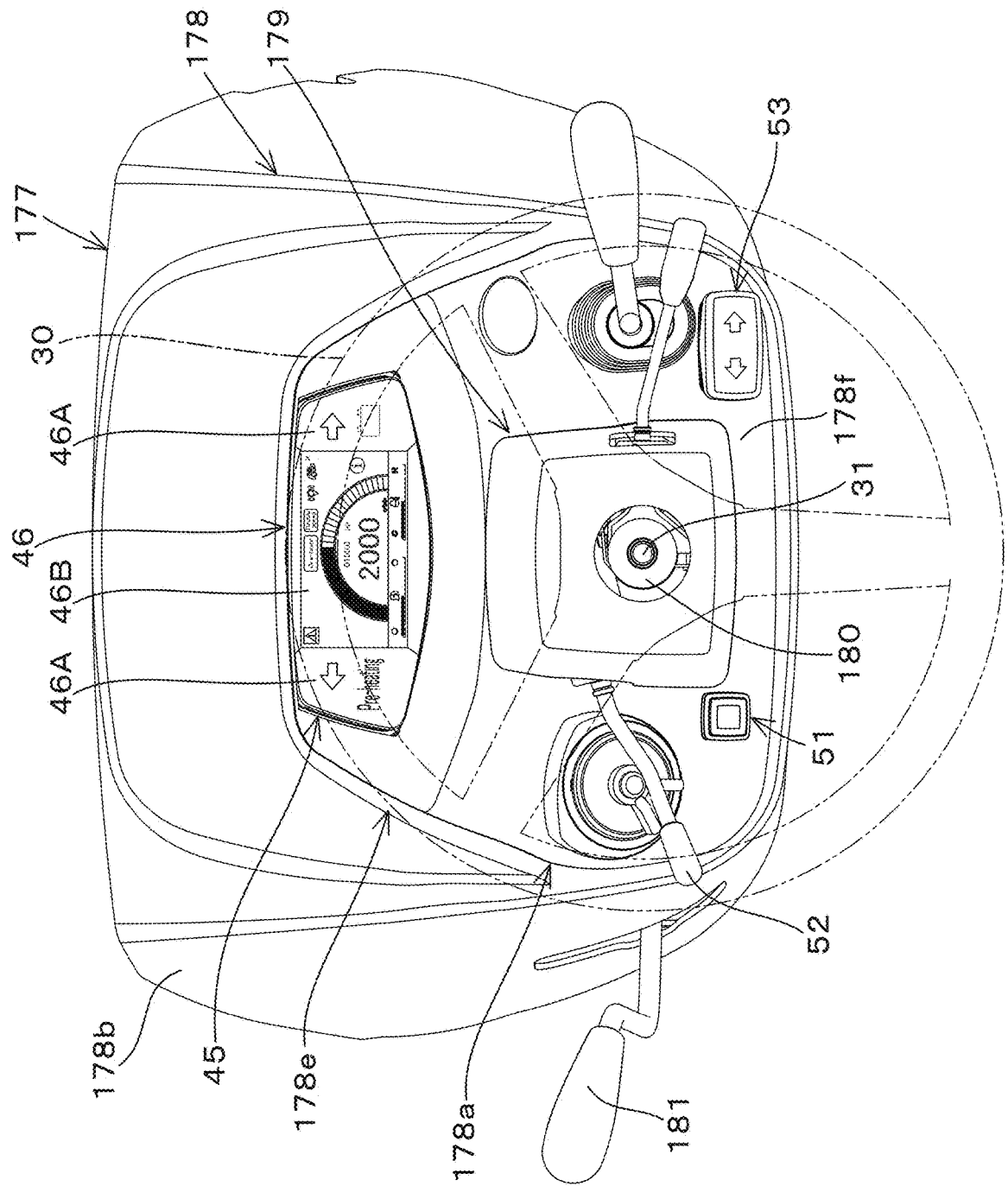
FIG. 6 is a view of a cover provided in front of an operator seat, which is seen from an operator seat side.

As shown in FIG. 6, the outer perimeter of the steering shaft 31 is covered by the steering post 180. The outer perimeter of the steering post 180 is covered by a cover 177. The cover 177 is provided in front of the operator seat 10. The cover 177 includes a panel cover 178 and a column cover 179.

The panel cover 178 supports the display device 45. The upper panel portion 178a of the panel cover 178 is provided with a support portion 178e that supports the display device 45. The support portion 178e supports the display device 45 in front of the steering shaft 31 and below the steering handle 30. The upper plate portion 178a includes an attachment surface 178f to which the setter switch 51 and the corrector switch 53 are attached. The attachment surface 178f is located behind the support portion 178e and below the steering handle 30. The support portion 178e and the attachment surface 178f are continuous, with the support portion 178e located in front of the upper plate portion 178a and the attachment surface 178f located at the rear portion of the upper plate portion 178a. The setter switch 51 and corrector switch 53 are mounted on the attachment surface 178f. The setter switch 51 and the corrector switch 53 are thus arranged around the steering shaft 31.

A shuttle lever 181 protrudes from the left plate portion 178b of the panel cover 178. The shuttle lever 181 switches the direction of traveling of the vehicle body 3. In more detail, by operating (pivoting) the shuttle lever 181 forward, the forward/backward switching portion 13 is in a state of outputting the forward traveling power to the traveling device 7, and the traveling direction of the vehicle body 3 is switched to a forward traveling direction. By operating (pivoting) the shuttle lever 181 backward, the forward/backward switching portion 13 outputs backward traveling power to the traveling device 7, and the traveling direction of the vehicle body 3 is switched to the backward traveling direction. When the shuttle lever 181 is in the neutral position, no power is output to the traveling device 7.

The column cover 179 is disposed below the steering wheel and covers the outer perimeter of the upper portion of the steering shaft 31. The column cover 179 preferably has a substantially square cylinder shape and protrudes upward from the attachment surface 178f of the panel cover 178. In other words, the attachment surface 178f is provided around the perimeter of the column cover 179. Thus, the setter switch 51 and corrector switch 53 mounted on the attachment surface 178f are located around the perimeter of the column cover 179.

Next, the arrangement of the setter switch 51, the steering changeover switch 52, and the corrector switch 53 will be described in detail. As shown in FIG. 6, the setter switch 51, the steering changeover switch 52, and the corrector switch 53 are arranged around the steering shaft 31.

The setter switch 51 is located on one side (left side) of the steering shaft 31. The steering changeover switch 52 is located on one side (left side) of the steering shaft 31. In the case of this preferred embodiment, the steering changeover switch 52 includes a pivotable lever. The steering changeover switch 52 is pivotable with a base point on the steering shaft 31 side. The base end of the steering changeover switch 52 is provided inside the column cover 179. The steering changeover switch 52 protrudes on one side (left side) of the column cover 179.

The corrector switch 53 is located on the other side (right side) of the steering shaft 31. More specifically, the corrector switch 53 is disposed on the right side and rearward (diagonally right rearward) of the steering shaft 31. The corrector switch 53 is disposed to the right and rear (diagonally right rear) of the column cover 179 in relation to the column cover 179. The corrector switch 53 is disposed at the right rear portion of the attachment surface 178f in relation to the attachment surface 178f of the panel cover 178. The fact that the corrector switch 53 is disposed at the rear portion of the inclined attachment surface 178f allows for a longer distance between the corrector switch 53 and the steering wheel 30. This can more reliably prevent unintentional operation of the corrector switch 53 and steering wheel 30.

As mentioned above, the setter switch 51, the steering changeover switch 52, the corrector switch 53 are arranged around the steering shaft 31. In other words, the setter switch 51, the steering changeover switch 52, and the corrector switch 53 are present in a centralized location around the steering shaft 31. Thus, the operator can clearly understand the location of each switch at a glance. In addition, the operator can operate each switch without changing his or her posture while seated on the operator seat 10. As a result, the operability of the switches is improved and erroneous operation can be prevented. In addition, the harnesses (wiring) distributed from each switch can be shortened.

In addition, the above-mentioned switch arrangement may be arranged with the left and right sides interchanged. That is, one side may be on the left and the other side on the right, or one side may be on the right and the other side on the left. In particular, for example, the setter switch 51 and the steering changeover switch 52 may be located on the right side of the steering shaft 31, and the corrector switch 53 may be located on the left side of the steering shaft 31.

As shown in FIG. 1, the tractor 1 is provided with a plurality of controller devices 60. The plurality of controller devices 60 are configured or programmed to control the traveling system, control the working system, calculate the vehicle position, and the like in the tractor 1. The plurality of controller devices include a first controller device 60A, a second controller device 60B, and a third controller device 60C.

The first controller device 60A receives the satellite signal received by the receiver 41 (received information) and the measurement information (acceleration, angular velocity, and the like) measured by the inertial measurement device 42, and determines the vehicle body position based on the received information and the measurement information. For example, when the correction amount by the corrector switch 53 is zero, that is, the correction of the vehicle position by the corrector switch 53 is not commanded, the first controller device 60A does not correct the calculated vehicle position W1 calculated based on the received information and the measurement information, and determines the calculated vehicle position W1 as the vehicle position to be used for the automatic steering. On the other hand, when the corrector switch 53 is commanded to correct the vehicle body position, the first controller device 60A sets the correction amount of the vehicle body position based on either the number of operations of the corrector switch 53 or the amount of operation of the corrector switch 53 (displacement amount), and then determines, as the vehicle position to be used for the automatic steering, the corrected vehicle position W3 obtained by correcting the calculated vehicle body position W1 with the correction amount.

The first controller device 60A sets a control signal based on the vehicle position (calculated vehicle position W1, corrected body position W3) and the scheduled traveling line L2, and outputs the control signal to the second controller device 60B. The second controller device 60B includes an automatic steering controller portion 200. The automatic steering controller portion 200 includes an electrical and electronic circuit in the second controller device 60B, a computer program stored in a CPU, and the like. The automatic steering controller portion 200 controls the steering motor 38 of the automatic steering mechanism 37 so that the vehicle body 3 travels along the scheduled traveling line L2 based on a control signal output from the first controller device 60A.

Figure 7:
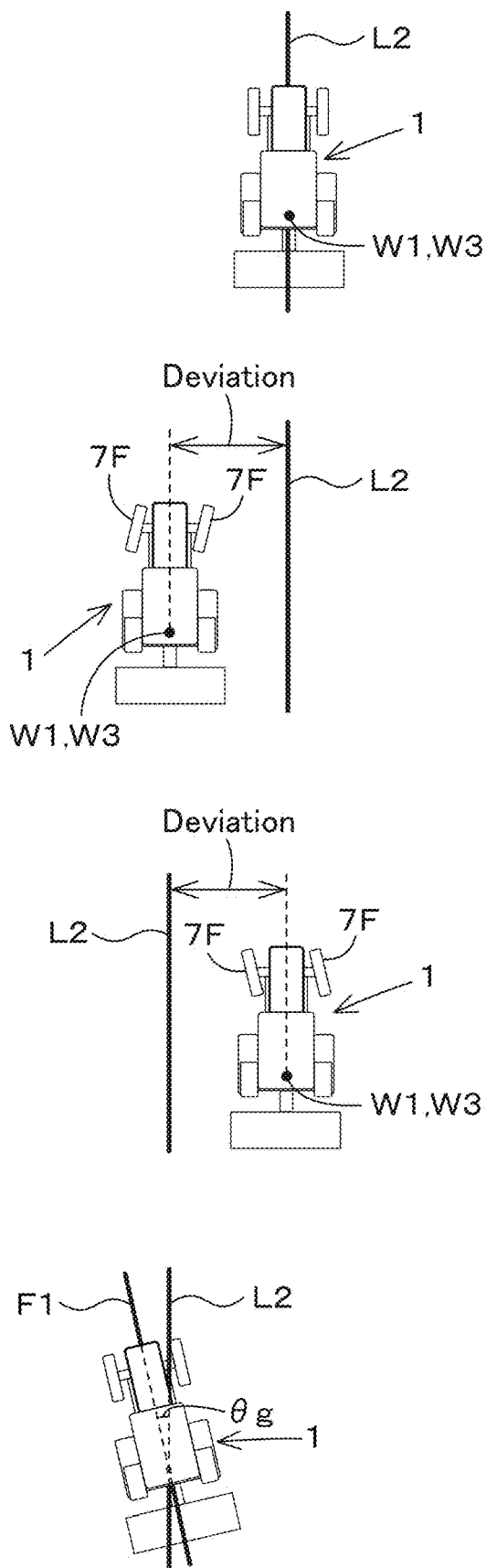
FIG. 7 is an explanation view explaining controls in automatic steering.

As shown in FIG. 7, when the deviation between the vehicle position and the scheduled traveling line L2 is less than a threshold value, the automatic steering controller portion 200 maintains the rotation angle of the rotation axis of the steering motor 38. When the deviation between the vehicle body position and the scheduled traveling line L2 (position deviation) is greater than or equal to the threshold value and the tractor 1 is located on the left side with respect to the scheduled traveling line L2, the automatic steering controller portion 200 rotates the rotation axis of the steering motor 38 so that the steering direction of the tractor 1 is in the right direction. That is, the automatic steering controller portion 200 sets the steering angle in the right direction so that the position deviation is zero. When the deviation between the vehicle position and the scheduled traveling line L2 is greater than or equal to a threshold value and the tractor 1 is located on the right side with respect to the scheduled traveling line L2, the automatic steering controller portion 200 rotates the rotational axis of the steering motor 38 so that the steering direction of the tractor 1 is in a left direction. That is, the automatic steering controller portion 200 sets the steering angle in the left direction so that the position deviation is zero. In the above-described preferred embodiment, the steering angle of the steering device 11 is changed based on the deviation between the vehicle body position and the scheduled traveling line L2. However, when the orientation of the scheduled traveling line L2 differs from the orientation of the direction of the tractor 1 (vehicle body 3) in the direction of travel (traveling direction) (vehicle body orientation) F1, that is, the vehicle body orientation to the scheduled traveling line L2. When the angle $\theta g$ of F1 is greater than or equal to a threshold value, the automatic steering controller portion 200 may set the steering angle so that the angle $\theta g$ becomes zero (vehicle orientation F1 matches the orientation of the scheduled traveling line L2). The automatic steering controller portion 200 may also set a final steering angle in the automatic steering based on the steering angle obtained based on the deviation (position deviation) and the steering angle obtained based on the orientation (orientational deviation). The setting of the steering angle in the automatic steering in the above-described preferred embodiments is an example and is not limited thereto.

The third controller device 60C raises and lowers the coupler portion 8 in response to the operation of an operating member provided around the operator seat 10. The first controller device 60A, the second controller device 60B and the third controller device 60C may be integrated. The control of the traveling system, the control of the working system, and the calculation of the vehicle position as described above are not limited.

As described above, the tractor 1 (vehicle body 3) can be steered automatically by the controller device 60.

Figure 8:
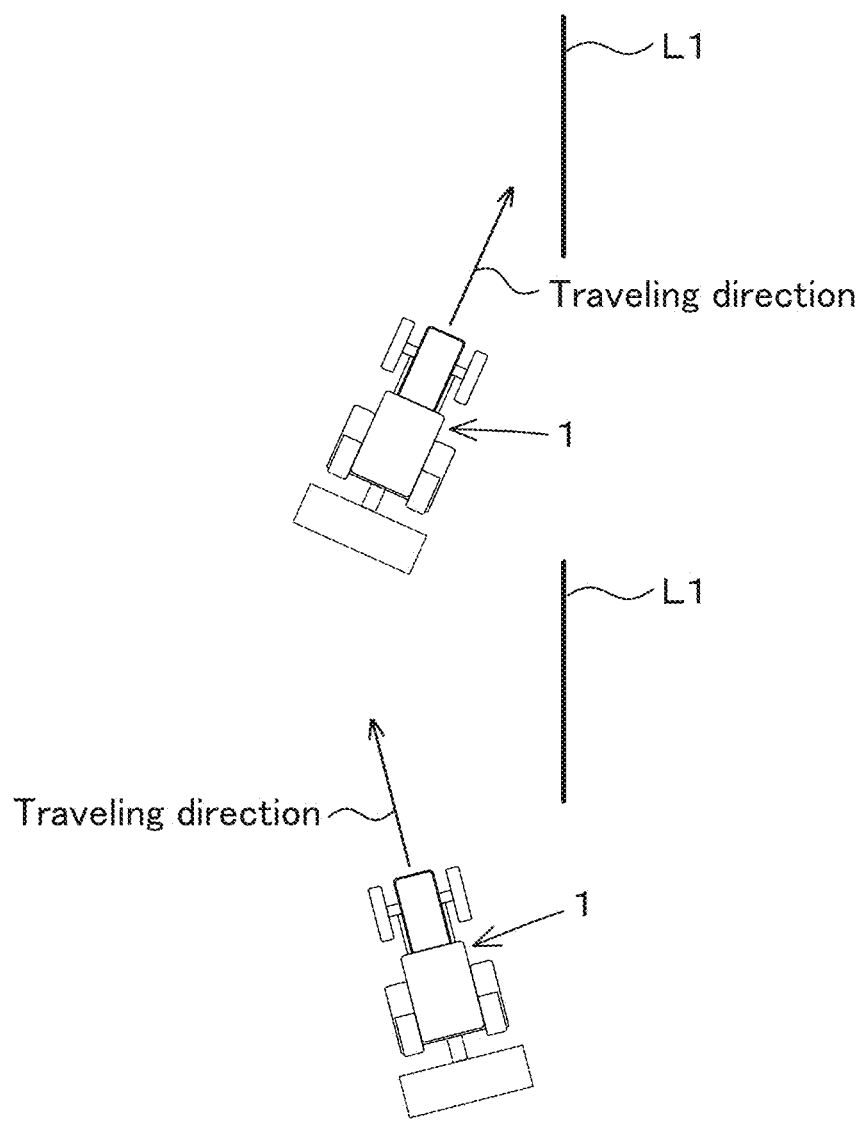
FIG. 8 is an explanation view of conditions of automatic steering.

Now, to perform the automatic steering after the setting of the traveling reference line L1, the conditions for the automatic steering must be adjusted. For example, as shown in FIG. 8, when the tractor 1 is turned and the tractor 1 meanders more than a predetermined distance before the automatic steering (when the vehicle orientation of the tractor 1 differs significantly from the traveling reference line L1), even when the automatic steering is started, it is not possible to steer the tractor along the scheduled traveling line L2 parallel or substantially parallel to the traveling reference line L1. When it is difficult to steer tractor 1 in manual handling, the second controller device 60B determines that the conditions for the automatic steering are not in place.

The second controller device 60B permits the automatic steering at least before the automatic steering, that is, based on a plurality of steering angles $\theta n$ (n=1, 2, 3 . . . n) of the steering device 11 when the tractor 1 (vehicle body 3) has traveled a predetermined distance under manual steering.

As shown in FIG. 1, the second controller device 60B is provided with a steering angle obtainer portion 201 and a steering judgment portion 202, in addition to the automatic steering controller portion 200. The steering angle obtainer portion 201 and the steering judgment portion 202 include electrical and electronic circuits in the second controller device 60B, a computer program stored in a CPU or the like.

Figure 9:
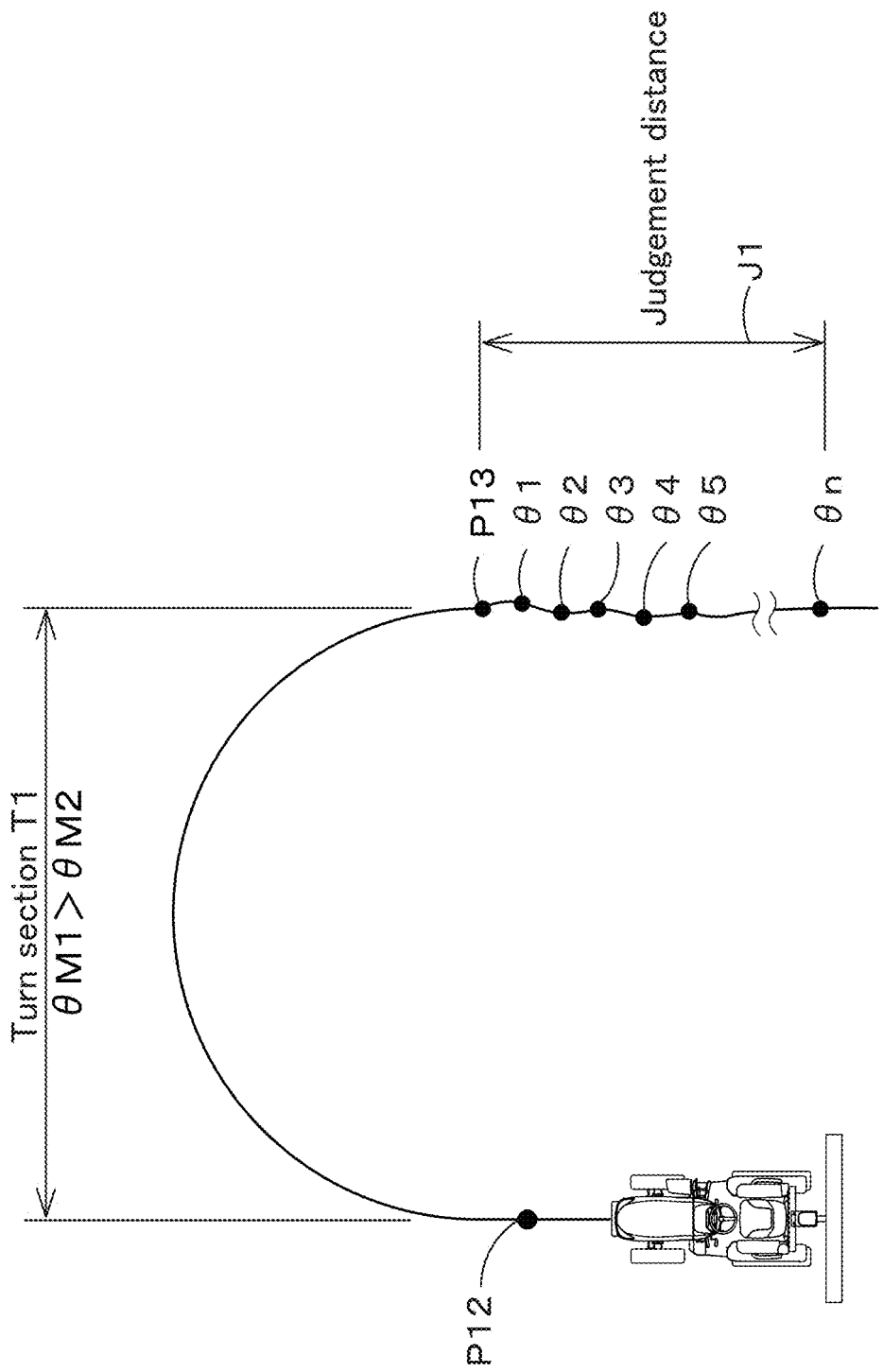
FIG. 9 is a view of obtaining a plurality of steering angles θn.

The steering angle obtainer portion 201 acquires a plurality of steering angles $\theta n$ of the steering device 11 at least during the manual steering. The steering angle obtainer portion 201 acquires the steering angle $\theta n$ detected by the steering angle detector device 205 on the vehicle body 3 at a predetermined time interval. As shown in FIG. 9, it is supposed, for example, that the automatic steering is terminated when the steering changeover switch 52 is operated at position P12. After position P12, the steering angle $\theta$ in the turning interval T1 is a large value and the steering angle obtainer portion 201 does not acquire the steering angle $\theta$ in the turning interval T1 because the steering angle $\theta$ is a large value and the steering angle obtainer portion 201 can determine that the tractor 1 is in a turning state. The steering angle obtainer portion 201 continuously acquires a plurality of steering angles $\theta n$ after position P13 where at least the current steering angle $\theta M1$ is less than or equal to the steering angle of the turn (the turning judgment steering angle $\theta M2$). The steering angle obtainer portion 201 acquires a plurality of steering angles $\theta n$ within a predetermined judging distance J1 from position P13, for example, or within a predetermined judging time from position P13 by the tractor 1.

The steering judgment portion 202 determines whether to permit the start of the automatic steering based on the plurality of steering angles θn acquired by the steering angle obtainer portion 201. The steering judgment portion 202 permits the start of the automatic steering when the variation of the plurality of steering angles θn acquired by the steering angle obtainer portion 201 is within a predetermined range, and does not permit the automatic steering when the variation of the plurality of steering angles θn is out of the predetermined range.

Figure 10A:
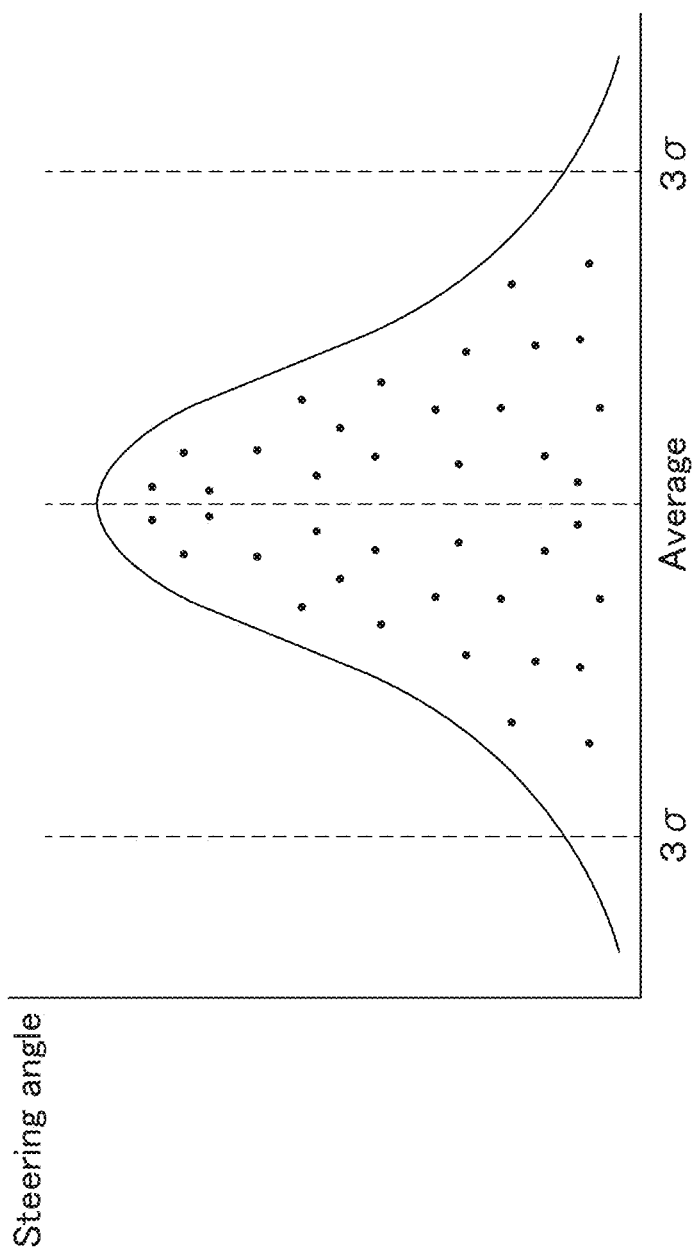
FIG. 10A is a view illustrating an example of distribution where a plurality of steering angles θn are less dispersed.
Figure 10B:
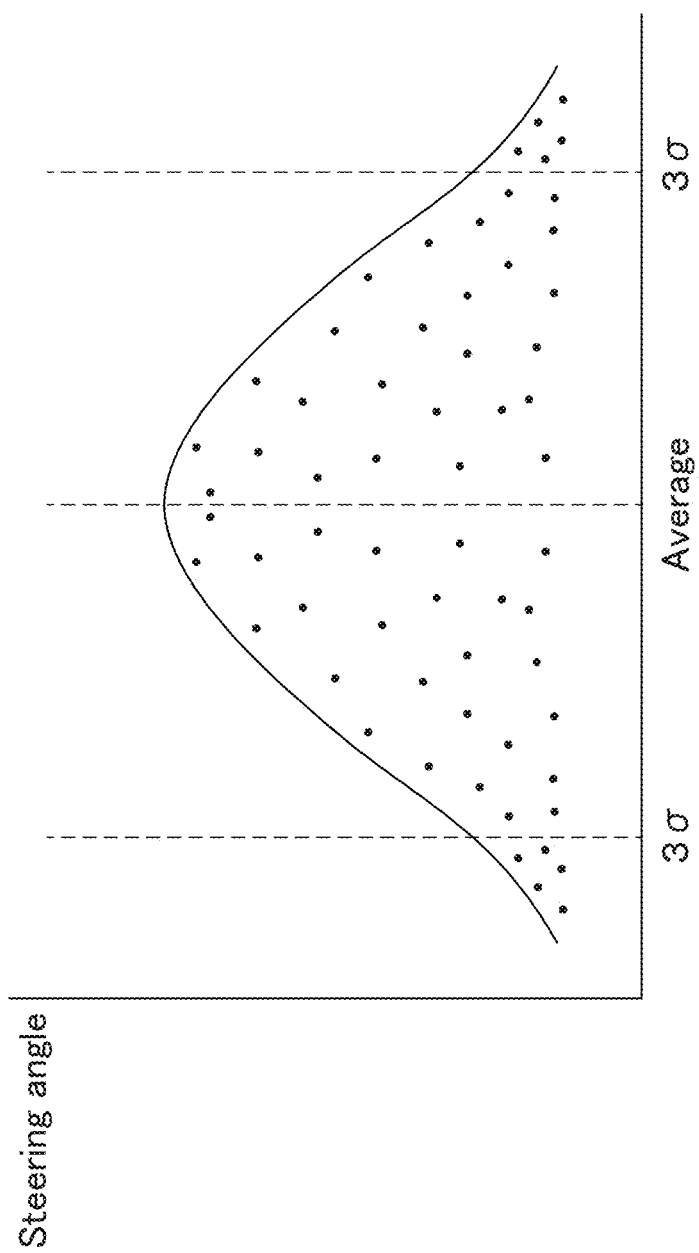
FIG. 10B is a view illustrating an example of distribution where a plurality of steering angles θn are much dispersed.

As shown in FIG. 10A, the steering judgment portion 202, for example, finds the standard deviation and the average value of the plurality of steering angles θn, and permits the start of the automatic steering when all the steering angles θn are within 3σ. On the other hand, as shown in FIG. 10B, the steering judgment portion 202 does not permit the start of the automatic steering when some of the steering angles θn are in a region that exceeds 3σ. In other words, the steering judgment portion 202 permits the automatic steering when the steering of the steering handle 30 is stable and the vehicle body 3 is considered to be moving in a straight direction, and does not permit the automatic steering when the steering of the steering handle 30 is not stable and the vehicle body 3 is not considered to be moving in a straight direction. In the above-mentioned preferred embodiment, it is assumed that the steering angle obtainer portion 201 does not acquire a plurality of steering angles θn during turn traveling, but instead, the steering angle obtainer portion 201 may acquire a plurality of steering angles θn during turn traveling, and the steering judgment portion 202 may remove the steering angle θn during turn traveling from the plurality of steering angles θn acquired by the steering angle obtainer portion 201, and then may judge the automatic steering with use of the removed steering angle θn.

The automatic steering controller portion 200 controls the steering device 11 as described above when the start of the automatic steering is switched by the steering changeover switch when the start of the automatic steering is judged to be permitted by the steering judgment portion 202, and the automatic steering is performed as described above.

Figure 11:
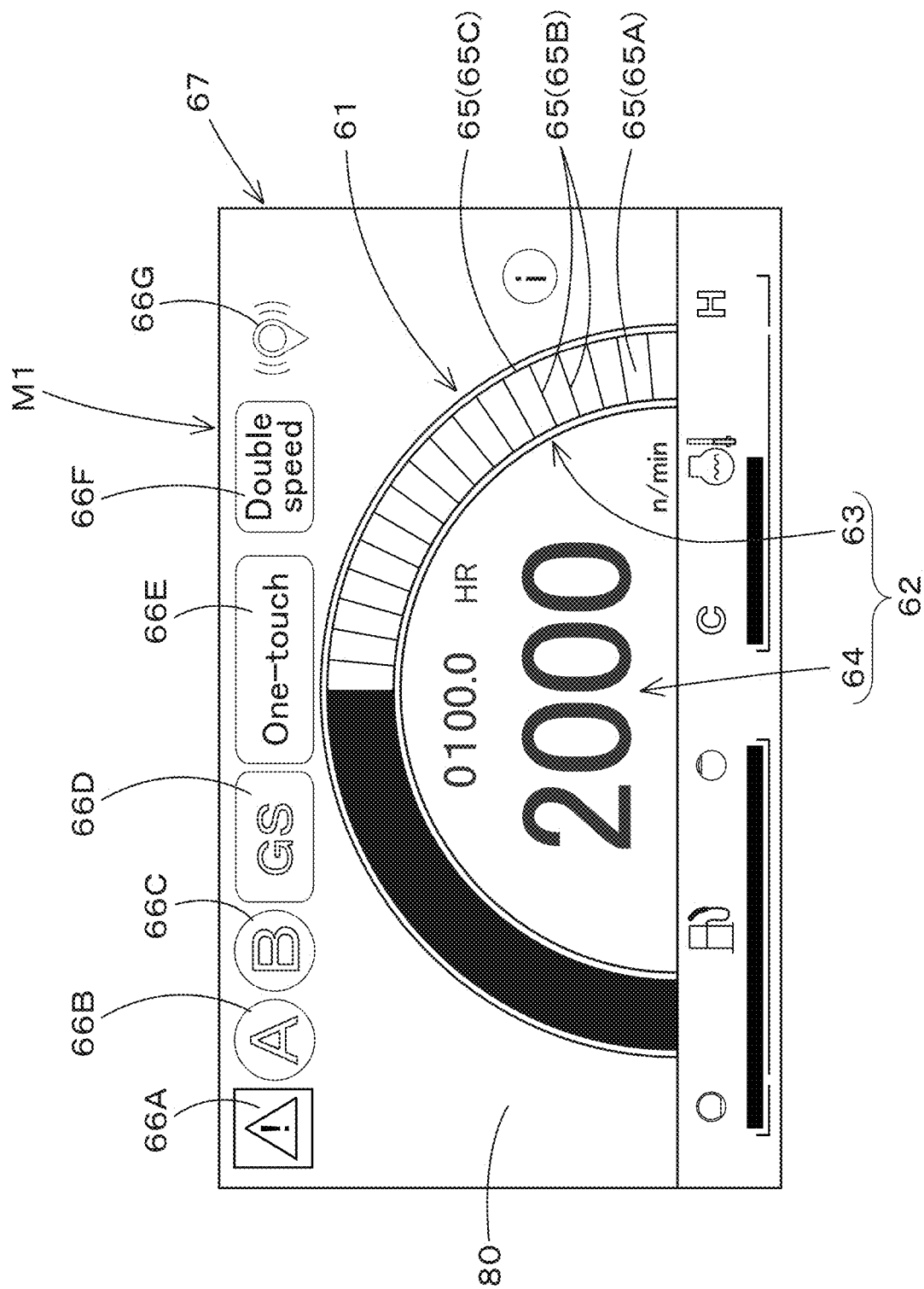
FIG. 11 is a view illustrating an example of a driving screen.

The display device 45 is capable of displaying that the start of the automatic steering has been determined to be permitted by the steering judgment portion 202. As shown in FIG. 11, when a predetermined action is performed on the display device 45, the display device 45 displays the driving screen M1.

The driving screen M1 includes an operation display portion 61 showing operation information. The operation display portion 61 includes a revolutions display portion 62 that displays the number of revolutions of the prime mover 4 (motor speed) as operation information. The revolutions display portion 62 includes a level display portion 63. The level display portion 63 displays the number of prime mover revolutions in stages. For example, the level display portion 63 includes a scale portion 65 and an indicator portion 80. The scale portion 65 has, for example, a first line 65A and a plurality of second lines 65B allocated at predetermined intervals along the first line 65A. The scale portion 65 also has a third line 65C separated from the first line 65A at predetermined intervals. The first line 65A and the third line 65C are, for example, formed in a semicircular shape, with one end (for example, the left side) representing the minimum value and the other end (for example, the right side) representing the maximum value.

The indicator portion 80 is a bar that varies in length according to the magnitude of the prime mover speed. The indicator portion 80 is located between the first line 65A and the third line 65C, for example, and has the shortest length at one end (left side) of the first line 65A and the third line 65C when the value of the prime mover speed is the minimum value of zero and has the longest length extending from one end (left side) of the first line 65A and the third line 65C to the other end of the first line 65A and the third line 65C (right side) when the value of the prime mover speed is the maximum value. The revolutions display portion 62 includes a numeric display portion 64. The numeric display portion 64 displays the number of prime mover revolutions in numbers. For example, the revolutions display portion 62 is located inside the semicircle of the first line 65A and the third line 65C.

Thus, according to the operation display portion 61, the revolutions speed of the prime mover such as the engine speed can be displayed in steps on the level display portion 63 and displayed numerically by the revolutions display portion 62.

The driving screen M1 includes an icon display portion 67 to display a plurality of icons 66. The icon display portion 67 is the portion where various information is indicated by the icon portion 66. That is, the setting relating to the traveling such as the automatic steering, for example, the setting state set in the setting mode is displayed on the icon portions 66. The icon display portion 67 is located in a different position from the driving display portion 61, for example, at the top of the driving screen M1.

The plurality of icon portions 66 include the first icon portion 66A, the second icon portion 66B, the third icon portion 66C, the fourth icon portion 66D, the fifth icon portion 66E, the sixth icon portion 66F, and the seventh icon portion 66G. The driving screen M1 need not have all of the plurality of icon portions 66 (66A, 66B, 66C, 66D, 66E, 66F, and 66G) and is not limited to the preferred embodiments described above.

The first icon portion 66A is displayed when a warning is issued. The second icon portion 66B is displayed when the start point P10 of the reference traveling line L1 is set. The third icon portion 66C is displayed when the end point P11 of the reference traveling line L1 is set.

The fourth icon portion 66D is displayed when the automatic steering is permitted. For example, the fourth icon portion 66D is displayed when the setting mode is valid and the setting of the traveling reference line L1 is completed, and the steering judgment portion 202 of the second controller device 60B has given permission for the automatic steering. By looking at the fourth icon portion 66D, the operator can see that the automatic steering is permitted. The operator can then start the automatic steering by operating the steering changeover switch 52.

The fifth icon portion 66E is displayed when the coupler portion 8 is in the lifted and lowered state. The sixth icon portion 66F is displayed when the 4WD is in a state of increasing the speed. The seventh icon portion 66G changes color and other colors depending on the receiving sensitivity of the receiving signal of the receiver device 41.

In the above-described preferred embodiment, the condition for permission of the automatic steering is that the variation of the plurality of steering angles θn is within a predetermined range, but it may be added to the condition that the orientation of the tractor 1 (vehicle body 3) before the automatic steering is within a predetermined range with respect to the orientation of the traveling reference line L1. As shown in FIG. 9, in a situation where the tractor 1 (vehicle body 3) is traveling in a judgment distance J1 after the position P13, the second controller device 60B permits the automatic steering with respect to the steering when the variation of the plurality of steering angles θn is within a predetermined range (first permit), and the orientation of the tractor 1 (vehicle body 3) calculated by the positioning device 40 and others is the automatic steering with respect to orientation is permitted (second permit) when the orientation F1 and the direction of the traveling reference line L1 (direction of extension) calculated by the positioning device and the like are within a predetermined range. The second controller device 60B then starts the automatic steering when the first and second permissions are aligned and the operator switches the start of the automatic steering.

The working vehicle 1 includes the steering device 11 including the steering handle 30, the vehicle body 3 capable of traveling either in the manual steering with the steering handle 30 or in the automatic steering of the steering handle 30 based on the traveling reference line L1, and the controller device 60B that permits the automatic steering based on a plurality of steering angles of the steering device 11 obtained when the vehicle body 3 travels in a predetermined distance in the manual steering. According to this configuration, in a situation where the working vehicle 1 is traveling in the manual steering, it is possible to determine whether or not it is possible to shift from the manual steering to the automatic steering based on a plurality of steering angles, that is, the state of the transition of the steering angles.

Figure 12:
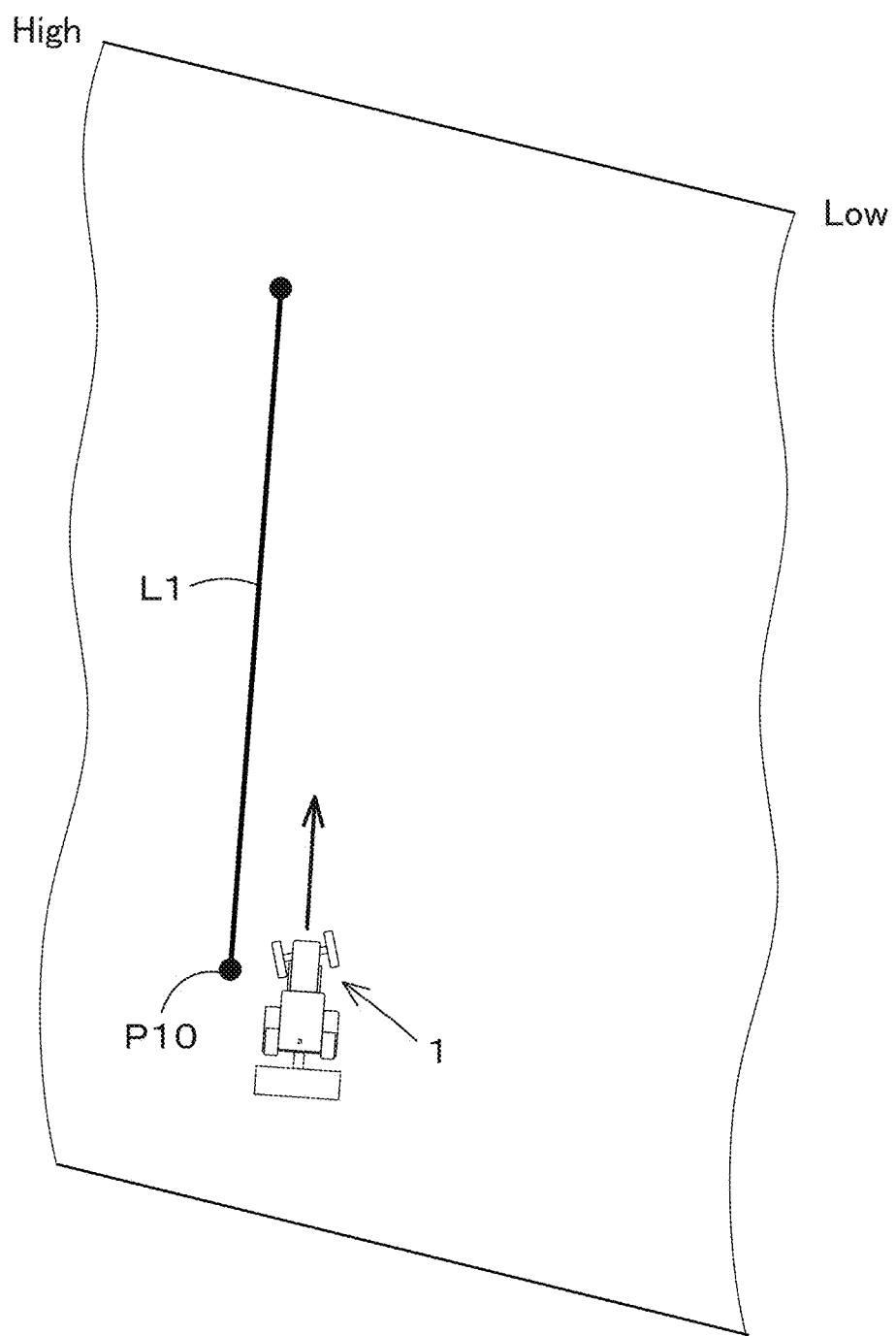
FIG. 12 is an explanation view explaining a tractor traveling on a slope.

For example, as shown in FIG. 12, when the working vehicle 1 is traveling on a right downward slope (a higher left side and lower right side slope as viewed from the working vehicle 1), the vehicle may be allowed to travel straight with the steering of the steering device 11 fixed to the left. In other words, when the steering direction of the steering device 11 is steered to the left, the vehicle will turn to the left in response to the steering direction on a level ground, but will travel straight on a slope, and the steering angle θ will be relatively large continuously compared to that on a level ground. Thus, in the case of an inclined ground, even when the steering angle θ is larger than on a level ground and continues continuously, the working vehicle 1 can properly judge straight ahead not only on a level ground but also on an inclined ground because the automatic steering is judged by a plurality of steering angles θn as described above, even when the steering angle θ is larger than on a level ground. This allows the working vehicle 1 to travel stably when switching from the manual steering to the automatic steering.

The working vehicle 1 is provided with the steering changeover switch 52 to switch either the start or end of the automatic steering. And, the controller device 60B includes the steering angle obtainer portion 201 that acquires a plurality of steering angles, the steering judgment portion 202 that determines whether or not to permit the start of the automatic steering based on the plurality of steering angles acquired by the steering angle obtainer portion 201, and the automatic steering controller portion 200 that controls the steering device 11 to perform the automatic steering when the start of the automatic steering is switched by the steering changeover switch 52 in a state determined to be permitted by the steering judgment portion 202. According to this configuration, a plurality of steering angles during the manual steering can be acquired by the steering angle obtainer portion 201, and the automatic steering can be performed by the automatic steering controller portion 200 after properly determining whether the automatic steering can be performed based on the plurality of steering angles by the steering judgment portion 202.

The working vehicle 1 is provided with the display device that displays that the start of the automatic steering is determined to be permitted by the steering judgment portion 202. According to this configuration, the operator can easily understand whether or not the start of the automatic steering is permitted by simply looking at the display device 45.

The steering judgment portion 202 permits the start of the automatic steering when the variation of the multiple steering angles is within a predetermined range. According to this configuration, the switch from manual to the automatic steering, that is, the start of the automatic steering, can be properly performed when the steering angles are stable.

The working vehicle 1 is provided with the positioning device 40 configured to detect the position of the vehicle body 3, and the reference traveling line setter switch configured to set the position of the vehicle body 3 detected by the positioning device 40 to the start and end positions of the traveling reference line L1. According to this configuration, the reference traveling line setter switch allows the setting of the traveling reference line L1 to be easily performed.

A second preferred embodiment of the present invention will be described below.

Now, the controller device 60 changes the control of the automatic steering based on the inclining of the vehicle body 3. The tilt of the vehicle body 3 is detected by a inclination detector device installed in the tractor 1 (vehicle body 3). In this second preferred embodiment, the inclination detector device is, for example, the inertial measurement device 42 including an acceleration sensor to detect acceleration, a gyroscope to detect angular velocity, and the like, which can detect the tractor 1 (vehicle body 3). In addition, the inclination detector device may be a device including a plurality of positioning devices 40 (for example, a GPS compass, and the like), or it may be any other device.

As shown in FIG. 1, the automatic steering controller portion 200 includes a parameter corrector portion 200*a*, a steering angle calculator portion 200*b*, and a steering controller portion 200*c*. The parameter corrector portion 200*a*, the steering angle calculator portion 200*b*, and the steering controller portion 200*c* include electrical and electronic components provided in the controller device 60, a computer program incorporated in the controller device 60, and the like.

The parameter corrector portion 200*a* changes a parameter to be applied in the automatic steering based on the inclination of the vehicle body 3 detected by the inclination detector device. For example, when the field on which the tractor 1 (vehicle body 3) travels is flat, the direction of traveling of the tractor 1 is easy to change to follow the magnitude of the steering angle of the steering device 11. On the other hand, when the work field in which the tractor 1 (vehicle body 3) travels is on a slope, the relation between the magnitude of the steering angle and the change in the direction of traveling of the tractor 1 changes more than on flat ground, since the tractor 1 (vehicle body 3) is affected by the slope. Thus, the parameter corrector portion 200*a* changes the parameter when the inclination of the vehicle body 3 detected by the inclination detector device is greater than or equal to a predetermined threshold.

For example, as shown in FIG. 14, when the tractor 1 is steered to one side (left side) of the tractor 1 in a work field where one side (left side) of the tractor 1 is high and the other side (right side) of the tractor 1 is low, that is, when the tractor 1 is steered toward the upward direction (upward) UP1, the parameter corrector portion 200*a* changes the parameter so that the steering angle is greater than a steering angle on a level ground without inclination. For example, the parameter corrector portion 200*a* corrects the parameter to increase the steering angle when either the angle of inclination of the vehicle body 3 in the width direction (roll angle) or the angle of inclination of the vehicle body 3 in the direction of travel (pitch angle) is other than a predetermined value, for example, +5 degrees (deg) or more.

On the other hand, when tractor 1 is steered to the other side (right side) of a downward slope, that is, when tractor 1 is steered in the downward direction (downward side) DN1, the parameter corrector portion 200*a* changes the parameter so that the steering angle is smaller than a steering angle on a level ground without inclination. For example, the parameter corrector portion 200*a* corrects the parameter in a direction that decreases the steering angle when either the roll angle of the vehicle body 3 or the pitch angle of the vehicle body 3 is other than a predetermined value, for example, −5 degrees (deg) or less. The threshold for the inclination of the vehicle body 3 is an example and is not limited thereto.

The parameter correction and the automatic steering by the parameter corrector portion 200*a* will be described in detail below.

The parameter corrector portion 200*a* determines the control gain G1, which is a parameter that determines the steering angle, based on the correction factor SG1 and a reference value (constant) SD1. That is, the parameter corrector portion 200*a* obtains the control gain G1 by the control gain G1=the correction factor SG1×the reference value SD1. Here, the correction factor SG1 is a value that is changed according to the slope. The reference value SD1 is a constant value set to find the control gain G1.

When the vehicle is traveling with the automatic steering over a work field without inclination, that is, when the angle of the vehicle body 3 detected by the inclination detector device is zero, the parameter corrector portion 200*a* sets the correction factor SG1 to 1.0 to obtain the control gain G1. When the angle of the vehicle body 3 is within a predetermined range, the parameter corrector portion 200*a* also sets the correction factor SG1 to 1.0. In other words, the parameter corrector portion 200*a* sets the control gain G1 corresponding to the level ground when the inclination of the vehicle body 3 is not large.

As shown in FIG. 14, when steering is performed in the upward direction UP1 under a situation where the vehicle body 3 is traveling on an inclined field with the automatic steering (the angle of the vehicle body 3 detected by the tilt detector, that is, either the roll angle or the pitch angle is out of the predetermined range), the parameter corrector portion 200*a* can adjust the correction factor SG1. The control gain G1 is changed by increasing the correction factor SG1 from 1.0 and multiplying the increased correction factor SG1 by the reference value (constant) SD1. The parameter corrector portion 200*a* increases the correction factor SG1 as the inclination of the vehicle body 3 increases, that is, as the slope increases. In other words, the parameter corrector portion 200*a* increases the amount of correction of the control gain G1, that is, the amount of increase in the correction factor SG1, as the inclination of the vehicle body 3 in the upward direction increases.

When steering is performed in the downward direction DN1, the parameter corrector portion 200*a* changes the control gain G1 by decreasing the correction factor SG1 more than 1.0 and multiplying the decreased correction factor SG1 by a reference value (constant) SD1. The parameter corrector portion 200*a* decreases the correction factor SG1 as the inclination of the vehicle body 3 in the downward direction increases, that is, as the slope in the downward direction becomes stronger. In other words, the parameter corrector portion 200*a* increases the amount of correction of the control gain G1, that is, the amount of decrease of the correction factor SG1, as the inclination of the vehicle body 3 in the downward direction increases.

The steering angle calculator portion 200*b* calculates the steering angle of the steering device 11 to reduce the deviation based on the deviation between the scheduled line L2 and the vehicle body 3 (a positional deviation and an orientational deviation) and the parameters. In particular, the steering angle in the automatic steering is determined based on the position deviation, ΔL1, between the vehicle body position (a calculated vehicle body position W1 and a corrected vehicle position W3) and the scheduled traveling line L2, and the control gain G1 determined by the parameter corrector portion 200*a*. The steering angle calculator portion 200*b* determines the steering angle by, for example, multiplying the position deviation ΔL1 by the control gain G1. The steering angle calculator portion 200*b* may use the control gain G1 to determine the steering angle, and the method for calculating the steering angle is not limited thereto.

Alternatively, the steering angle calculator portion 200*b* determines the steering angle in the automatic steering based on the orientational deviation between the vehicle orientation and the scheduled traveling line L2 and the control gain G1 determined by the parameter corrector portion 200*a*. The steering angle calculator portion 200*b* obtains the steering angle by, for example, multiplying the orientational deviation by the control gain G1.

The steering controller portion 200*c* controls the steering device 11 based on the steering angle (calculated steering angle) calculated by the steering angle calculator portion 200*b*. As described above, the steering controller portion 200*c* controls the steering motor 38 so that when the tractor 1 is located on the left side with respect to the scheduled traveling line L2, the steering angle of the tractor 1 in the right direction is the calculated steering angle. The steering controller portion 200*c* controls the steering motor 38 so that the steering angle of the tractor 1 in the left direction of the tractor 1 is the arithmetic steering angle when the tractor 1 is located on the right side with respect to the scheduled traveling line L2, as described above.

Figure 15A:
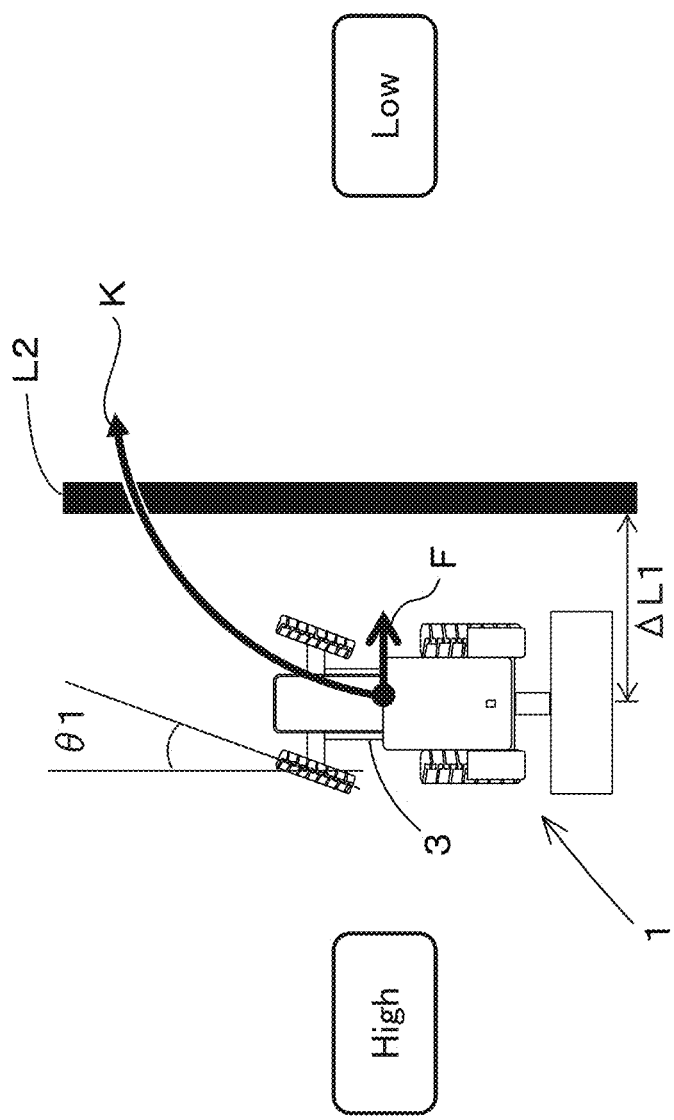
FIG. 15A is a view illustrating a state where a tractor is steered to a downward direction without correcting a parameter (a control gain).

As shown in FIG. 15A, when tractor 1 is steered in the downward direction, when steering is performed at a steering angle θ1 without correcting the control gain G1, the vehicle body 3 is subjected to an external force F in the lowland direction (slope direction) due to the slope, and the direction of traveling of the tractor 1 changes significantly, and the travel trajectory K changes quickly than that on a level ground. This causes the tractor 1 to move to a position where it overshoots the scheduled traveling line L2.

On the other hand, when the tractor 1 is steered in the downward direction, when the inclination of the vehicle body 3 obtained from the slope detector is greater than a predetermined value, the control gain G1 is changed by the parameter corrector portion 200*a*, so that the steering angle θ2 in the automatic steering, as shown in FIG. 15B, is becomes smaller than the steering angle θ1 in FIG. 15A. Thus, even when the traveling body 3 is subjected to an external force F in the lowland direction (inclination direction) due to the inclination, the change in the direction of traveling of the tractor 1 can be reduced, and the travel trajectory K can easily be made to match the scheduled traveling line L2.

As shown in FIG. 16A, when the tractor 1 is steered in the upward direction, when the steering is performed at a steering angle θ1 without correcting the control gain G1, the vehicle body 3 receives an external force F in the lowland (sloping) direction, so the change in the direction of traveling of the tractor 1 is small, and the travel trajectory K changes more gradual than that on level ground. Thus, the tractor 1 will remain in a position before the scheduled traveling line L2.

Figure 16B:
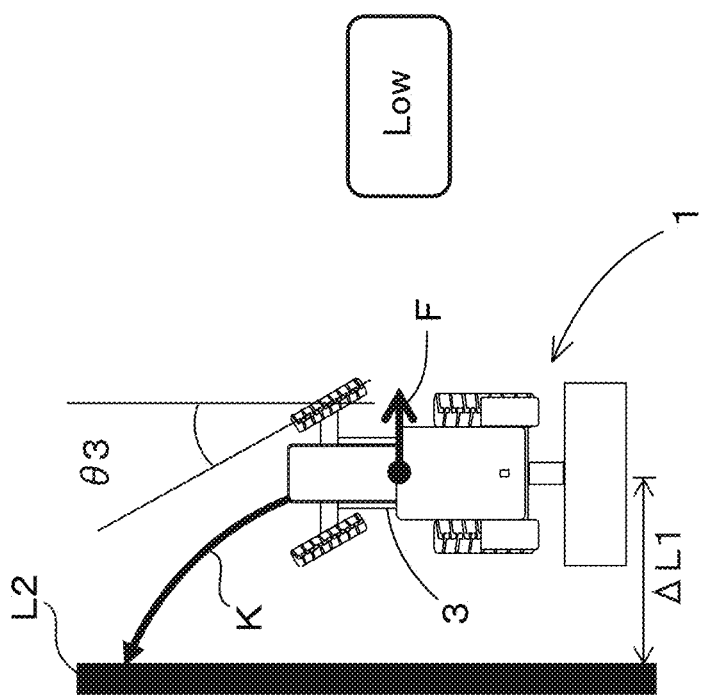
FIG. 16B is a view illustrating a state where a tractor is steered to an upward direction with a parameter (a control gain) corrected.

On the other hand, when the tractor 1 is steered in the upward direction, when the inclination of the vehicle body 3 obtained from the inclination detector device is greater than a predetermined value, the control gain G1 is changed by the parameter corrector portion 200a, so that the steering angle θ3 in the automatic steering, as shown in FIG. 16B, becomes larger than the steering angle θ1 in FIG. 15A. Thus, even when the traveling body 3 is subjected to an external force F in the lowland direction (inclination direction) due to the inclination, the change in the direction of traveling of the tractor 1 can be increased, and the travel trajectory K can easily be made to match the planned line L2.

In FIGS. 15A and 15B, and FIGS. 16A and 16B, the explanation was given for the width direction with respect to the vehicle body 3. However, the same effect can be achieved when the vehicle body 3 is inclined with respect to the direction of traveling of the vehicle body 3, whether it is uphill or downhill. For example, when the angle of inclination (pitch angle) of the vehicle body 3 with respect to the direction of travel is greater than a predetermined value compared to that of the level ground, and the angle is an upward slope as viewed from the vehicle body 3, the control gain G1 is increased by the parameter corrector portion 200a, so that the steering angle θ3 in response to the pitch angle is greater than the steering angle θ1 set without correction. This makes it easier to change the direction of traveling of the vehicle body 3 when the vehicle body 3 is moving up the field compared to the changing on the level ground.

When the inclination angle (pitch angle) of the vehicle body 3 in the direction of travel is greater than the predetermined angle of travel (pitch angle) of the vehicle body 3 compared to the level ground, and the angle is a downward slope as viewed from the vehicle body 3, the control gain G1 is reduced by the parameter corrector portion 200a, so that the steering angle θ2 in response to the pitch angle is smaller than the steering angle θ1 set without correction. Thus, when the vehicle body 3 is moving down the field, the direction of traveling of the vehicle body 3 can be changed more gradually compared to the changing on level ground.

The working vehicle 1 includes the steering device 11 to change the orientation of the vehicle body 3, the inclination detector device to detect the inclination of the vehicle body 3, a steering angle calculator portion 200b to calculate the steering angle of the steering device 11 to reduce the deviation based on the deviation between the planned line L2 and the vehicle body 3 and predetermined parameters, and the parameter corrector portion 200a to change a parameter to be applied to the steering angle calculator portion 200b based on the inclination of the vehicle body 3 detected by the inclination detector device. According to this configuration, when the vehicle body 3 is steered by the steering device 11, which reduces the deviation between the scheduled traveling line L2 and the vehicle body 3, the parameter to be applied to the steering angle calculator portion 200b is changed when the vehicle body 3 is inclined, so that the steering behavior of the vehicle body 3 can be changed in response to the inclination of the vehicle body 3. For example, when the vehicle body 3 is traveling on a sloping ground, it can easily be made to travel along the scheduled traveling line L2.

The parameter corrector portion 200a changes the parameter when the inclination of the vehicle body 3 detected by the inclination detector device is greater than or equal to a predetermined threshold value. According to this configuration, the parameter is corrected under circumstances where the leaning of the vehicle body 3 affects the steering, that is, when the leaning of the vehicle body 3 is greater than or equal to the threshold, so that the vehicle body 3 can be driven along the scheduled traveling line L2 both on flat ground with little leaning and on sloping ground with large leaning.

The parameter corrector portion 200a corrects the parameter in a direction in which the steering angle increases when the inclination of the vehicle body 3 obtained from the inclination detector device indicates an upward direction, and corrects the parameter in a direction in which the steering angle decreases when the inclination of the vehicle body 3 indicates a downward direction. In this manner, for example, when the vehicle body 3 is traveling upward on a sloping ground, the parameter is corrected to increase the steering angle by correcting the parameter, thus eliminating the difficulty of the vehicle body 3 in turning due to the influence of the hill climbing. For example, when the vehicle body 3 traveling downward on a sloping ground, the parameter correction reduces the steering angle so that the vehicle body 3 does not turn too much due to the effect of the hill descending.

The parameter corrector portion 200a increases the amount of correction of the parameter in accordance with the increase in the inclination of the vehicle body 3 acquired from the inclination detector device. In this manner, the amount of correction can be increased in accordance with the slope, whether the vehicle body 3 is traveling up or down a slope, and the steering can be performed based on an inclination of the slope.

The parameter corrector portion 200a changes the control gain to calculate the steering angle of the steering device 11 as a parameter. According to this configuration, the steering angle can be easily obtained by changing the control gain SG1.

Other configurations of the second preferred embodiment are configured in the same way as the first preferred embodiment.

Next, a third preferred embodiment of the present invention will be described below.

Now, in order to perform the automatic steering after the setting of the traveling reference line L1, it is necessary to adjust the conditions for the automatic steering. For example, as shown in FIG. 17, when, after turning the tractor 1 and before the automatic steering, the orientation of the tractor 1 in the direction of travel (vehicle orientation) F1 and the orientation of the travel reference line L1 (line orientation) F2 are significantly different, it is difficult to steer the tractor 1 along the planned travel line L2, which is parallel or substantially parallel to the travel reference line L1, even when automatic steering is initiated. In such a case, the second controller device 60B determines that the conditions for the automatic steering are not satisfied.

The second controller device 60B makes a determination (judgment) whether or not to permit the automatic steering at least prior to the automatic steering, that is, based on the vehicle orientation F1 of the tractor 1 (vehicle body 3) and the orientation of the traveling reference line L1 (line orientation) F2 in the manual steering. As shown in FIG. 1, the second controller device 60B is provided with an orientation judgment portion (orientation judgment circuit) 207. The orientation judgment portion 207 includes an electrical and electronic circuit in the second controller device 60B, a computer program stored in a CPU or the like. The orientation judgment portion 207 permits the automatic steering when the orientational difference ΔF between the vehicle orientation F1 and the line orientation F2 is within the judgment range G1, and does not permit the automatic steering when it is out of the judgment range G1.

Figure 18:
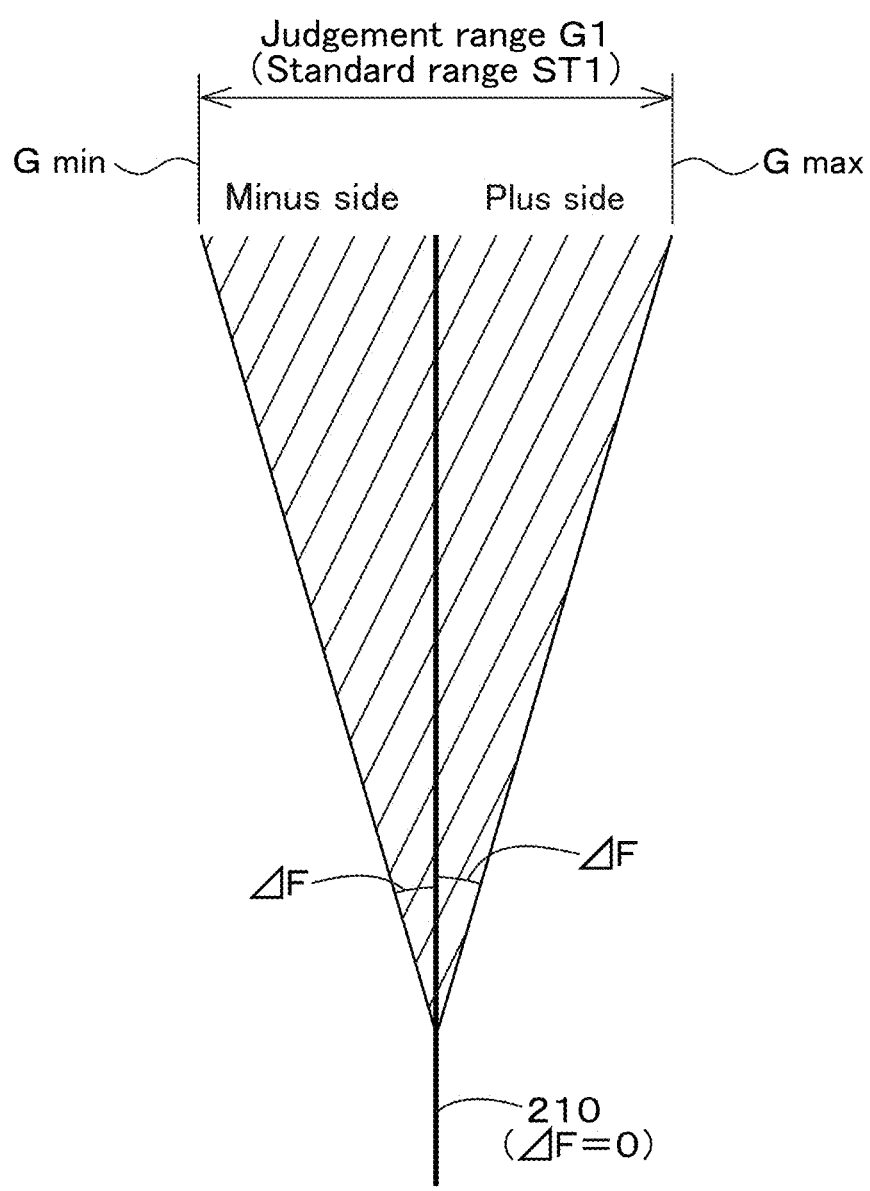
FIG. 18 is a view illustrating a relation between an orientational difference ΔF and a judgment range G1.

FIG. 18 shows the relation between the orientational difference ΔF and the judgment range G1. As shown in FIG. 18, the judgment range G1 is a range shown as negative on one side (left side) and positive on the other side (right side), centered on a reference traveling line 210 (reference traveling line 210) where the vehicle orientation F1 and the line orientation F2 coincide (the reference traveling line 210 where the orientational difference ΔF is zero). The lower limit Gmin of the judgment range G1 is on the negative side, and the upper limit Gmax, is on the positive side. In FIG. 18, the positive and negative in the judgment range G1 are set for convenience and are not limited to the examples described above.

When the inclination of the vehicle body 3 of the tractor 1 in the width direction of the tractor 1, that is, when the roll angle of the vehicle body 3 is horizontal and the slope is zero (level ground), the lower limit Gmin and the upper limit Gmax of the judgment range G1 are predetermined values, and when the lower limit Gmin and the upper limit Gmax are considered in absolute values, they are the same values.

Thus, in a state where the tractor 1 is traveling in a horizontal state without leaning in the width direction, that is, in a state where the tractor 1 is traveling in a work field without inclining, when the orientational difference ΔF between the vehicle orientation F1 and the line orientation F2 is within the judgment range G1, the orientation judgment portion 207 permits the automatic steering, and when the orientational difference ΔF is out of the judgment range G1, the automatic steering is not permitted.

In the third preferred embodiment described above, the second controller device 60B determines whether or not to permit the automatic steering based on the orientational difference ΔF and the judgment range G1. In addition, the second controller portion 60B changes the judgment range G1 used for the automatic steering according to the inclination of the vehicle body 3*whnf* the tractor 1 (vehicle body 3) is traveling at an angle. The inclination of the vehicle body 3 is detected by an inclination detector device provided in the tractor 1 (vehicle body 3). In the third preferred embodiment, the inclination detector device is an inertial measurement device 42 including, for example, an acceleration sensor to detect acceleration, a gyroscope to detect angular velocity, and the like, which can detect the tractor 1 (vehicle body 3). In addition, the inclination detector device may be a device including a plurality of positioning devices 40 (for example, a GPS compass, and the like), or it may be any other device.

As described above, when the inclination of the vehicle body 3 of the tractor 1 in the width direction of the tractor 1, that is, the roll angle of the vehicle body 3 is horizontal and the inclination is zero, as shown in FIG. 18, the orientation judgment portion 207 sets the judgment range G1 to the standard range ST1 and determines whether the automatic steering is permitted or not based on the standard range ST1.

Figure 19A:
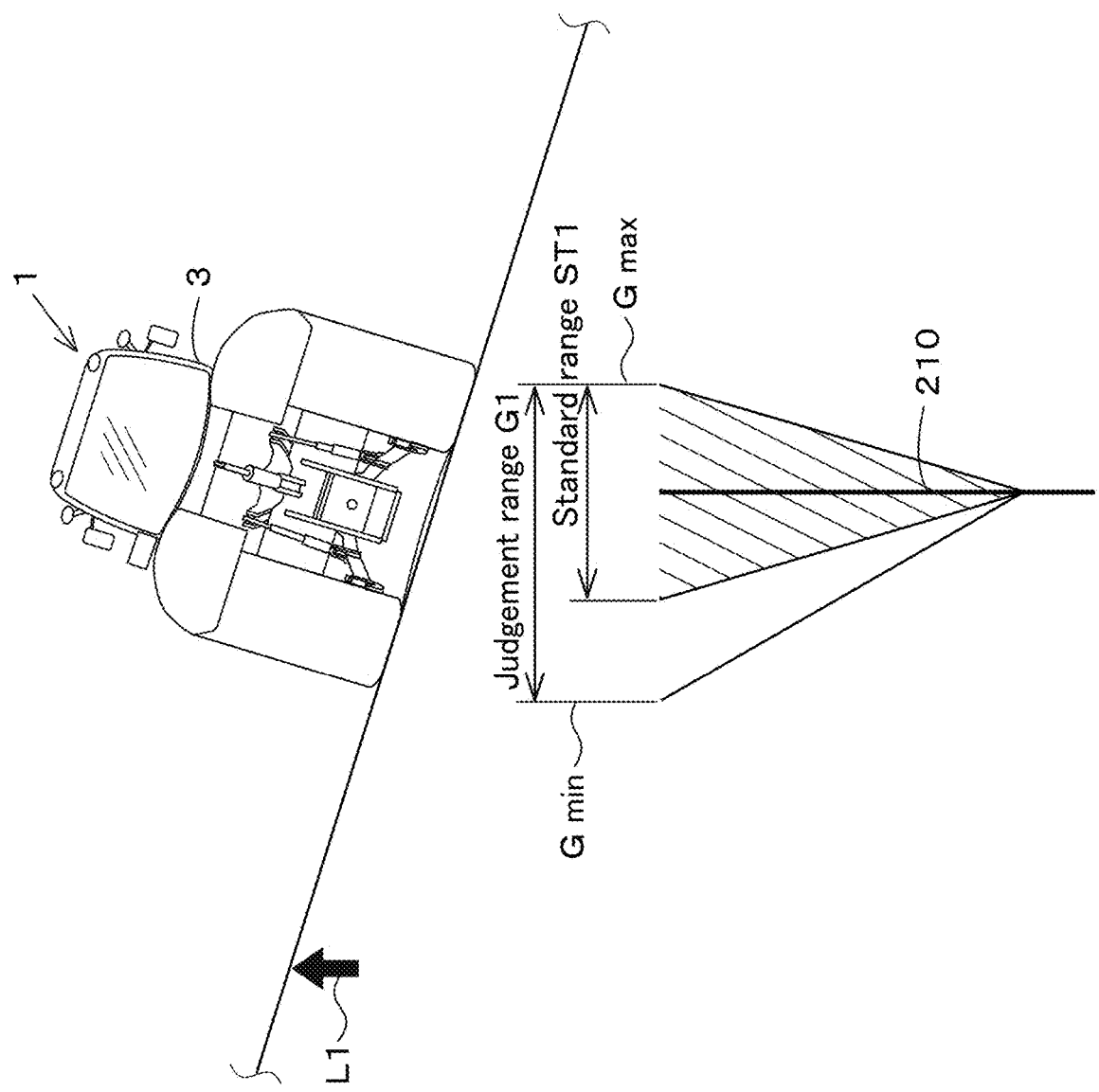
FIG. 19A is an explanation view explaining an example of changing a lower limit value of a judgment range G1 in a case where a tractor inclines downward right.

As shown in FIG. 19A, when the tractor 1 (vehicle body 3) is inclined in such a way that one side (left side) of the tractor 1 (vehicle body 3) in the width direction is higher than the other side (right side) in the width direction, the second controller device 60B makes the lower limit Gmin of the judgment range G1 greater than the lower limit Gmin indicated in the standard range ST1. That is, in viewing the traveling reference line L1 from the tractor 1, the lower limit Gmin of the judgment range G1 is increased when the traveling reference line L1 is high and the tractor 1 side is low falling to the right. In this case, the orientation judgment portion 207 determines whether or not to permit the automatic steering based on the judgment range G1 in which the lower limit Gmin is increased.

As shown in FIG. 19A, when tractor 1 is inclined downward to the right, when looking at the range of judgment range G1, the lower limit Gmin corresponding to the higher side (one side) of the tractor 1 is increased. In addition, as shown in FIG. 19C, it is preferred that the upper limit Gmax opposite to the lower limit Gmin in the judgement range Gmin is less than the upper limit Gmax of the standard range ST1. In other words, in cases where tractor is inclined downward to the right, the upper value Gmax corresponding to the lower side (other side) of the tractor 1 is reduced.

Figure 19B:
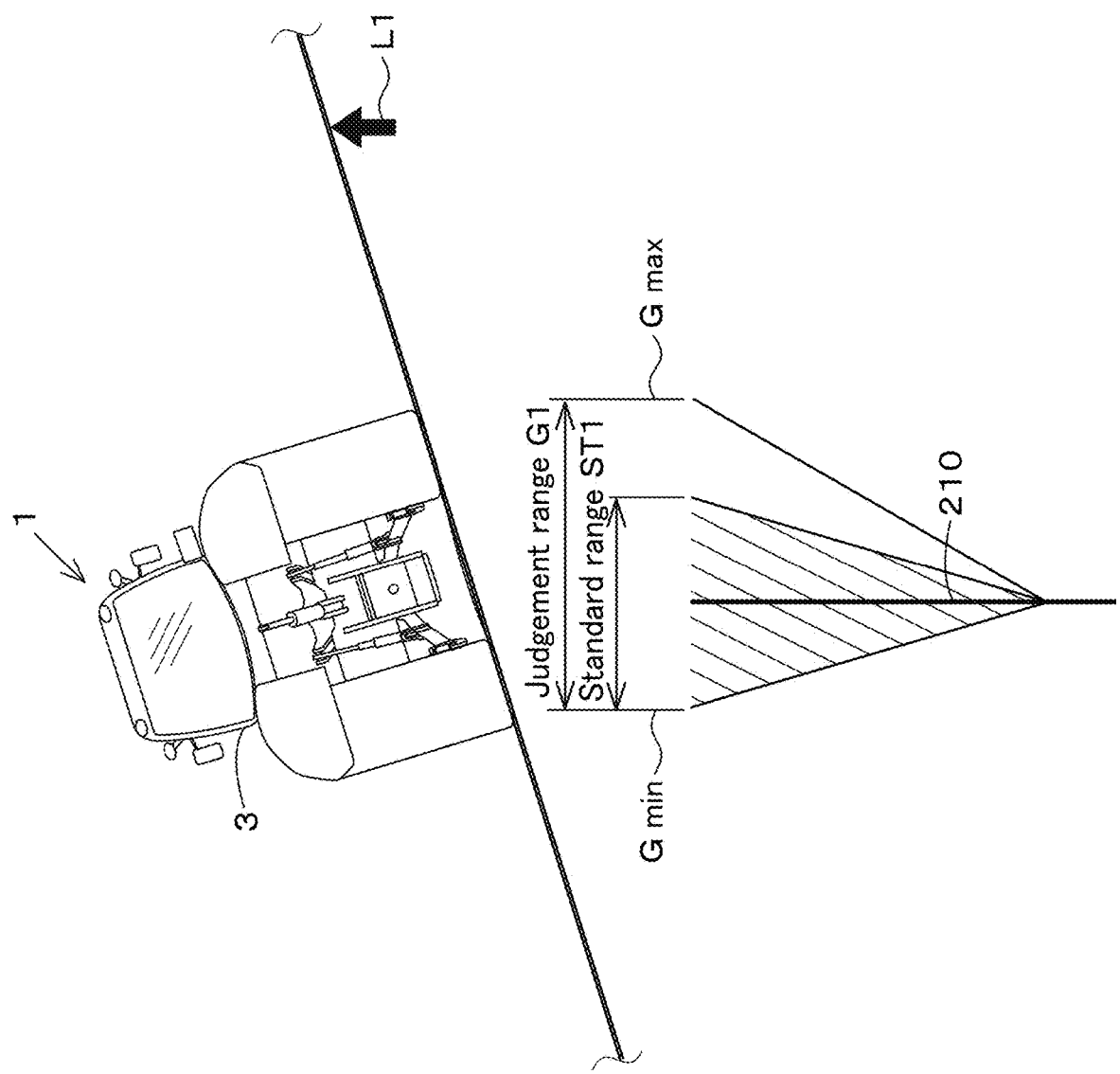
FIG. 19B is an explanation view explaining an example of changing an upper limit value of a judgment range G1 in a case where a tractor inclines downward left.
Figure 19C:
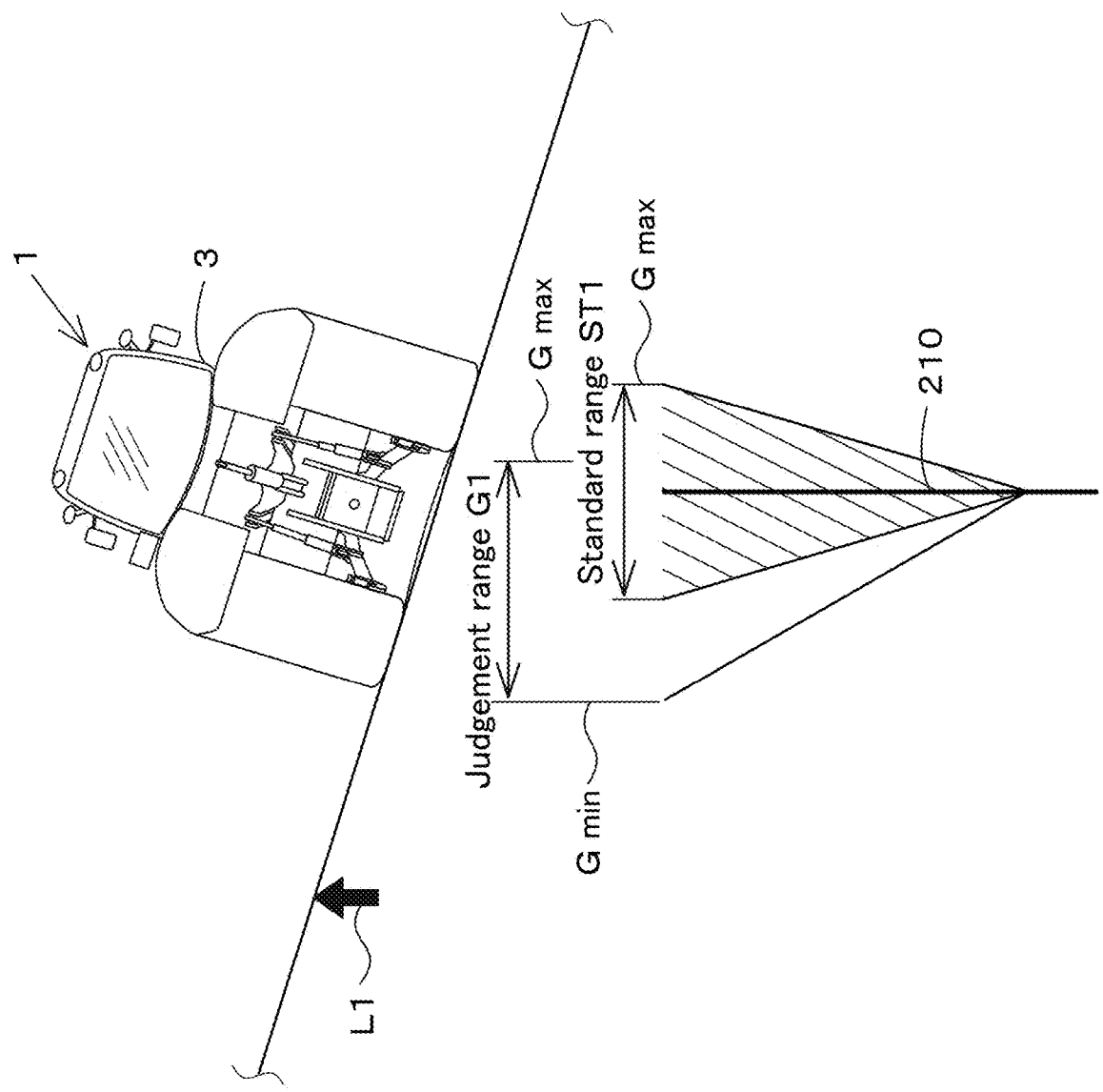
FIG. 19C is an explanation view explaining an example of changing an upper limit value of a judgment range G1 in a case where a tractor inclines downward right.

As shown in FIG. 19B, when the tractor 1 (vehicle body 3) is inclined so that one side (left side) is lower than the other side (right side) in the width direction, as shown in FIG. 19B, the second controller device 60B makes the upper limit Gmax of the judgment range G1 greater than the upper limit Gmax indicated in the standard range ST1. That is, in viewing the traveling reference line L1 from the tractor 1, the upper limit value Gmax of the judgment range G1 is increased when the traveling reference line L1 is high and the tractor 1 side is low falling to the left. In this case, the orientation judgment portion 207 determines whether the automatic steering is permitted or not based on the judgment range G1 in which the upper limit value Gmax is increased.

Figure 19D:
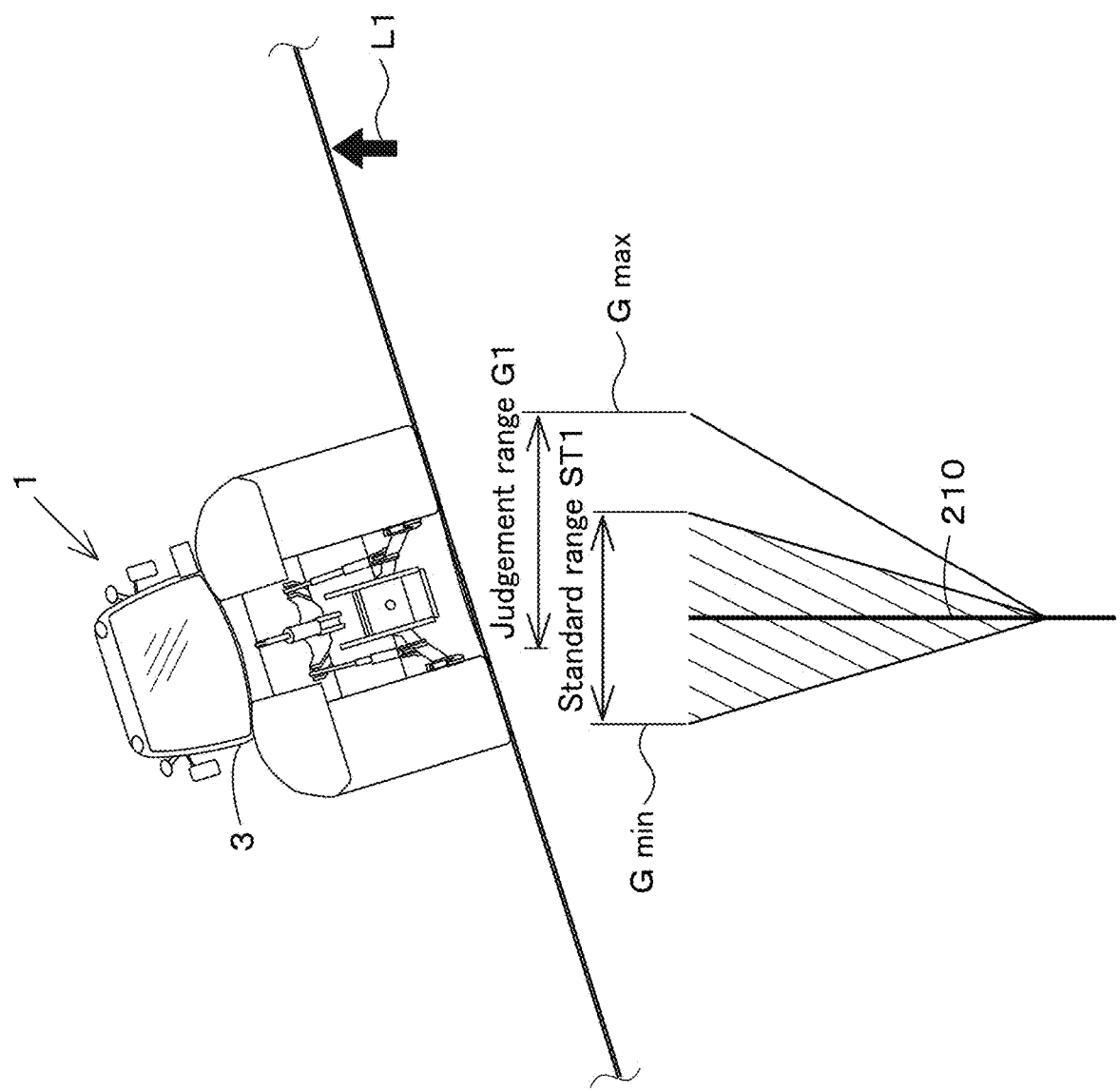
FIG. 19D is an explanation view explaining an example of changing a lower limit value of a judgment range G1 in a case where a tractor inclines downward left.

As shown in FIG. 19B, when tractor 1 is tilted downward to the left, the upper limit Gmax corresponding to the higher side of tractor 1 (right side) is increased when looking at the range of judgment range G1. In addition, as shown in FIG. 19D, it is preferable to make the lower limit Gmin opposite to the upper limit Gmax of the judgment range G1 smaller than the lower limit Gmin of the standard range ST1. In other words, when tractor 1 is inclined downward to the left, the lower limit Gmin corresponding to the lower side (one side) of the tractor 1 is reduced.

In changing the lower limit Gmin and upper limit Gmax of the judgment range G1, the second controller device 60B increases the lower limit Gmin and the upper limit Gmax according to the degree of the slope (inclination magnitude) of the vehicle body of the tractor 1 in the width direction of the vehicle body 3 (roll angle of the vehicle body 3). That is, the second controller device 60B increases the lower limit Gmin and upper limit Gmax with respect to the standard range ST1 when the inclination amount is large, and decreases the lower limit Gmin and upper limit Gmax with respect to the standard range ST1 when the inclination amount is small.

The automatic steering controller portion 200 controls the steering device 11 as described above when the start of the automatic steering is switched by the steering changeover switch 52 when the start of the automatic steering is determined to be permitted by the orientation judgment portion 207.

The display device 45 is capable of displaying that the start of the automatic steering has been determined to be permitted by the orientation judgment portion 207.

In the third preferred embodiment, for example, the fourth icon portion 66D is displayed when the setting mode is valid and the completion of the setting of the traveling reference line L1, and the orientation judgment portion 207 of the second controller device 60B has given permission for the automatic steering. By looking at the fourth icon portion 66D, the operator can see that the automatic steering is permitted. The operator can then start the automatic steering by operating the steering changeover switch 52.

In the third preferred embodiment described above, the condition for permitting the automatic steering is that the orientational difference ΔF is within a predetermined range, but a condition may be added that the steering angle of the steering device 11 is within a predetermined range. That is, in a situation where the tractor 1 (vehicle body 3) is being steered by the manual steering, the second controller device 60B permits the automatic steering with respect to the orientation (first permit) when the orientational difference ΔF is within a predetermined range, and permits the automatic steering with respect to the steering (second permit) when the steering angle θ of the steering device 11 is within a predetermined range. The second controller device 60B then starts the automatic steering when the first and second permissions are issued and the operator switches to the start of the automatic steering.

The working vehicle 1 includes the steering device 11 including the steering handle 30, the vehicle body 3 configured to travel either in the manual steering with the steering handle 30 or in the automatic steering of the steering handle 30 based on the traveling reference line L1, the positioning device 40 configured to detect the orientation F1 of the vehicle body 3, the inclination detector device to detect the inclination of the vehicle body 3, and the controller device 60B configured to permit the automatic steering by the steering device 11 when the difference ΔF between the orientation F1 of the vehicle body 3 detected by the positioning device 40 and the orientation F2 of the traveling reference line L1 is within the judgment range G and to perform the automatic steering by the steering device when permitting the automatic steering. The controller device 60B changes the judgment range depending on the inclination of the vehicle body 3 detected by the inclination detector device. According to this configuration, in either a case where the traveling orientation of the working vehicle 1 is an uphill direction (the vehicle orientation is oriented in the uphill direction) or a case where the traveling orientation of the working vehicle 1 is a down-hill direction (the vehicle orientation is oriented in the down-hill direction), it is possible to appropriately start the automatic steering in response to the inclination in operating the working vehicle 1 (vehicle body 3) on a slope. That is, the traveling can be stable in switching the steering from the manual steering to the automatic steering even on the slope.

The controller device 60B changes the lower limit Gmin of the judgment range G1 in accordance with the inclination of the vehicle body 3, when the vehicle body 3 is inclined such that one side of the vehicle body 3 in the width direction is higher than the other side in the width direction. The controller device 60B also changes the upper limit Gmax of the judgment range G1 in accordance with the inclination of the vehicle body 3 when the vehicle body 3 is inclined such that one side of the vehicle body 3 in the width direction is lower than the other side in the width direction.

According to this configuration, when the working vehicle 1 (vehicle body 3) travels on a slope, the lower limit value Gmin corresponding to the higher side (one side) of the tractor 1 can be increased and the upper limit value Gmax corresponding to the higher side (other side) of the tractor 1 can be increased. In other words, in the judgment range G1, the values of the higher side of the working vehicle 1 (vehicle body 3) (the upper limit Gmax and the lower limit Gmin) are increased. As a result, when the working vehicle 1 is manually steered to the higher side and then automatically steered (when the tractor 1 is manually steered in the uphill direction and then automatically steered), it is possible to increase the difference in orientation between the vehicle orientation and the line orientation before switching to the automatic steering. Thus, when the working vehicle 1 starts the automatic steering in the uphill direction, the vehicle will be able to travel consistently on a slope just after switching to the automatic steering.

As shown in FIG. 19C, when the tractor 1 inclines so that the other side (right side) of the tractor 1 is lower than the one side (left side), the controller device 60B makes the upper limit value Gmax corresponding to the other side (right side) smaller than the predetermined standard range ST1. In addition, as shown in FIG. 19D, when the tractor 1 inclines such that one side (left side) of the tractor 1 is lower than the other side (right side), the controller device 60B makes the lower limit Gmin corresponding to one side (left side) less than the predetermined standard range ST1.

According to this configuration, when the working vehicle 1 is manually steered to the lower side and then automatically steered (when the tractor 1 is manually steered in the downhill direction and then automatically steered), it is possible to reduce the difference in orientation between the vehicle orientation and the line orientation before switching to the automatic steering. Thus, when the working vehicle 1 starts the automatic steering in the downhill direction, the vehicle can travel consistently on a slope just after switching to the automatic steering.

The working vehicle 1 includes the steering changeover switch 52 to be switched between the start and end of the automatic steering, and the controller device 60B starts the automatic steering by the steering device 11 when the steering changeover switch 52 is switched to the start of the automatic steering under the condition where the automatic steering is permitted. According to this configuration, the steering changeover switch 52 allows the operator to command the start of the automatic steering at the time when the operator needs to perform the start of the automatic steering.

The working vehicle 1 includes the display device 45 that displays that the orientational difference ΔF between the orientation of the vehicle body 3 detected by the positioning device 40 and the orientation F2 of the traveling reference line L1 is within the judgment range G1. According to this configuration, the operator can easily understand by looking at the display device 45 that the vehicle is in a state where the automatic steering can be started.

The working vehicle 1 includes the reference traveling line setter switch that sets the position of the vehicle body 3 detected by the positioning device 40 to the start and end positions of the traveling reference line L1. According to this configuration, the setting of the traveling reference line L1 can be easily performed.

Figure 20:
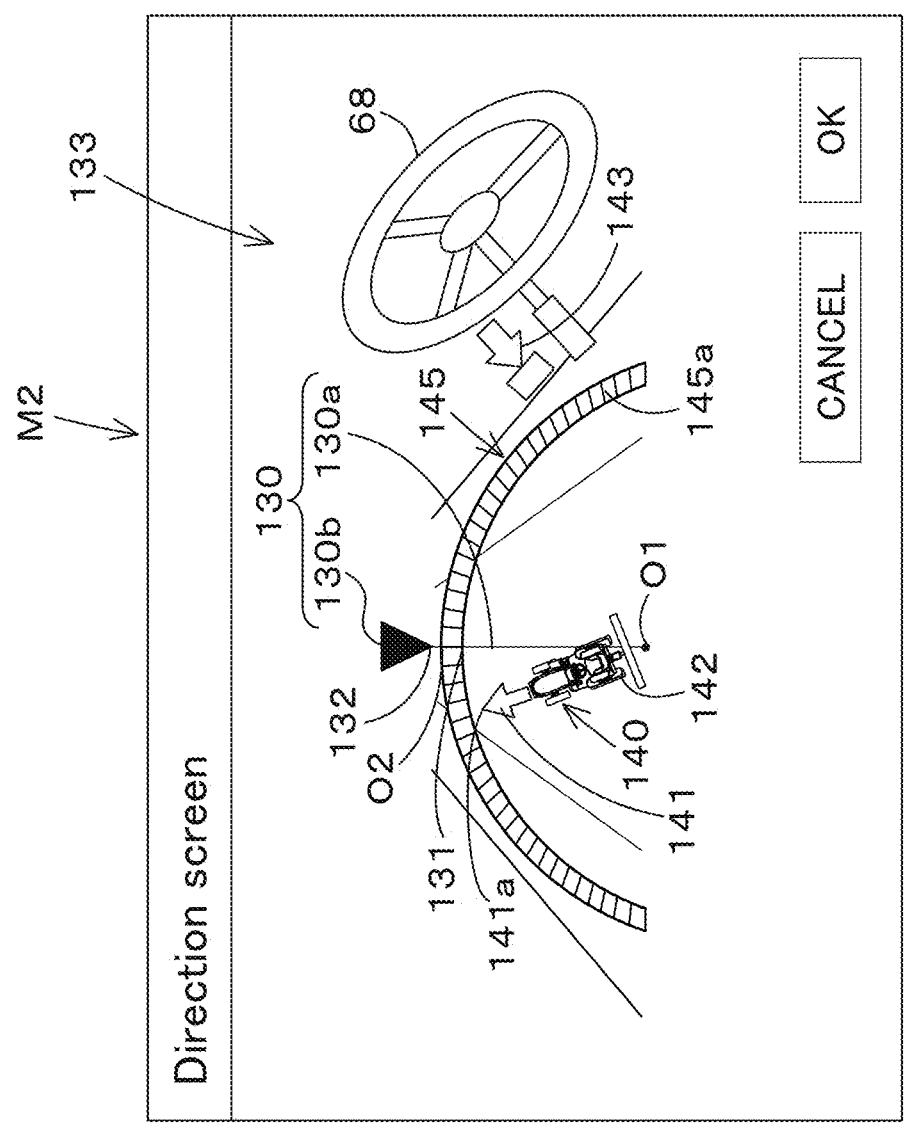
FIG. 20 is a view illustrating an example of an orientation screen M2.

Now, the display device 45 is capable of displaying the line orientation F2 and vehicle orientation F1 of the traveling reference line L1. As shown in FIG. 20, when a predetermined action is performed on the display device 45, the display device 45 displays a orientation screen M2. The orientation screen M2 includes a line orientation display portion 130 and a vehicle orientation display portion 140.

The line orientation display portion 130 is configured to indicate the line orientation F2 of the traveling reference line L1 and includes the line display portion 130a and the mark portion 130b. The line display portion 130a representing the traveling reference line L1 itself with a line diagram and the like, and extends from the bottom to the top on a field 133 set in the orientation screen M2. The mark portion 130*b* indicates a direction of the traveling reference line L1, for example, is arranged on the upper portion of the end portion 131 of the line display portion 130*a* in the field 133. In the mark portion 130*b*, the vertex 132 of the triangle points to the end portion 131 of the line display portion 130*a*.

The vehicle orientation display portion 140 includes an orientation indicator portion 141 that points to a direction of the vehicle body 3 (vehicle orientation F1). The orientation indicator portion 141 points to a direction in which the body bearing F1 faces with respect to the line orientation F2.

The orientation indicator portion 141 includes, for example, a graphic such as an arrow, and the orientation indicator portion 141 moves to one side or the other of the line display portion 130*a* with respect to the origin O1 set on the line display portion 130*a*.

The vehicle orientation display portion 140 also includes the vehicle body display portion 142, which shows the tractor 1 (vehicle body 3) in graphic form. The vehicle body display portion 142, like the orientation indicator portion 141, changes position (display position) according to the orientation around the origin O1. In detail, the orientation indicator portion 141 is arranged in front of the vehicle body display portion 142 (on the front of the tractor 1), and the vehicle body display portion 142 and the orientation indicator portion 141 simultaneously oscillate according to the vehicle orientation F1.

Figure 21A:
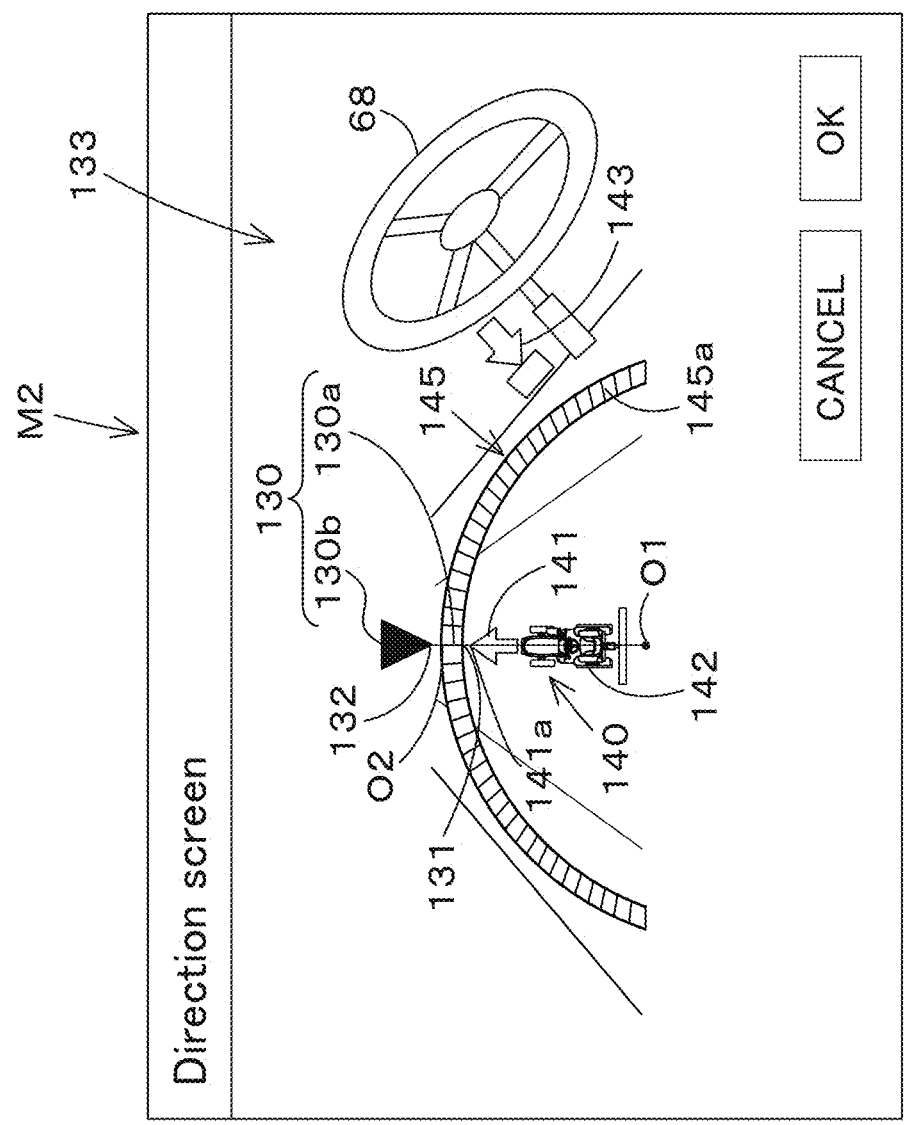
FIG. 21A is a view illustrating an orientation screen M2 in a case where a vehicle orientation F1 coincides with a line orientation F2.
Figure 21B:
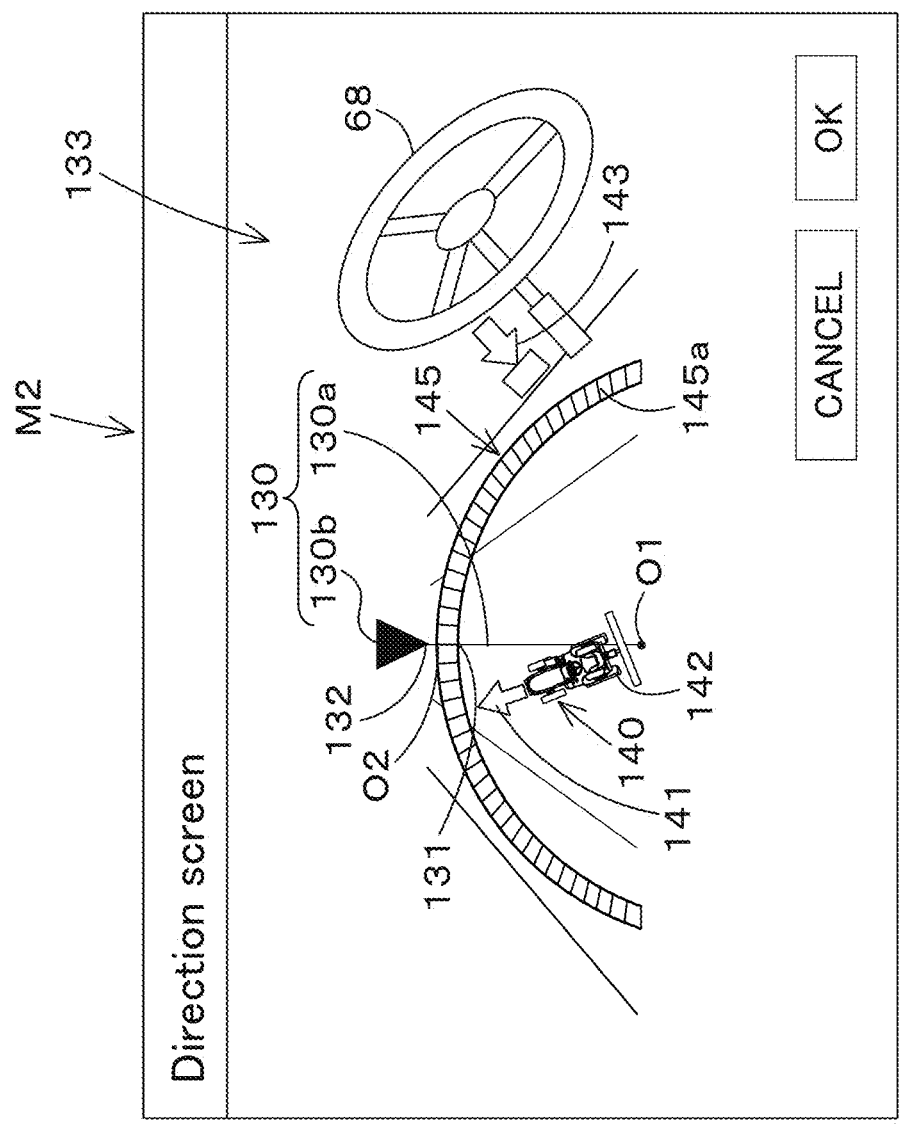
FIG. 21B is a view illustrating an orientation screen M2 in a case where a vehicle orientation F1 slightly offsets leftward with respect to a line orientation F2.
Figure 21C:
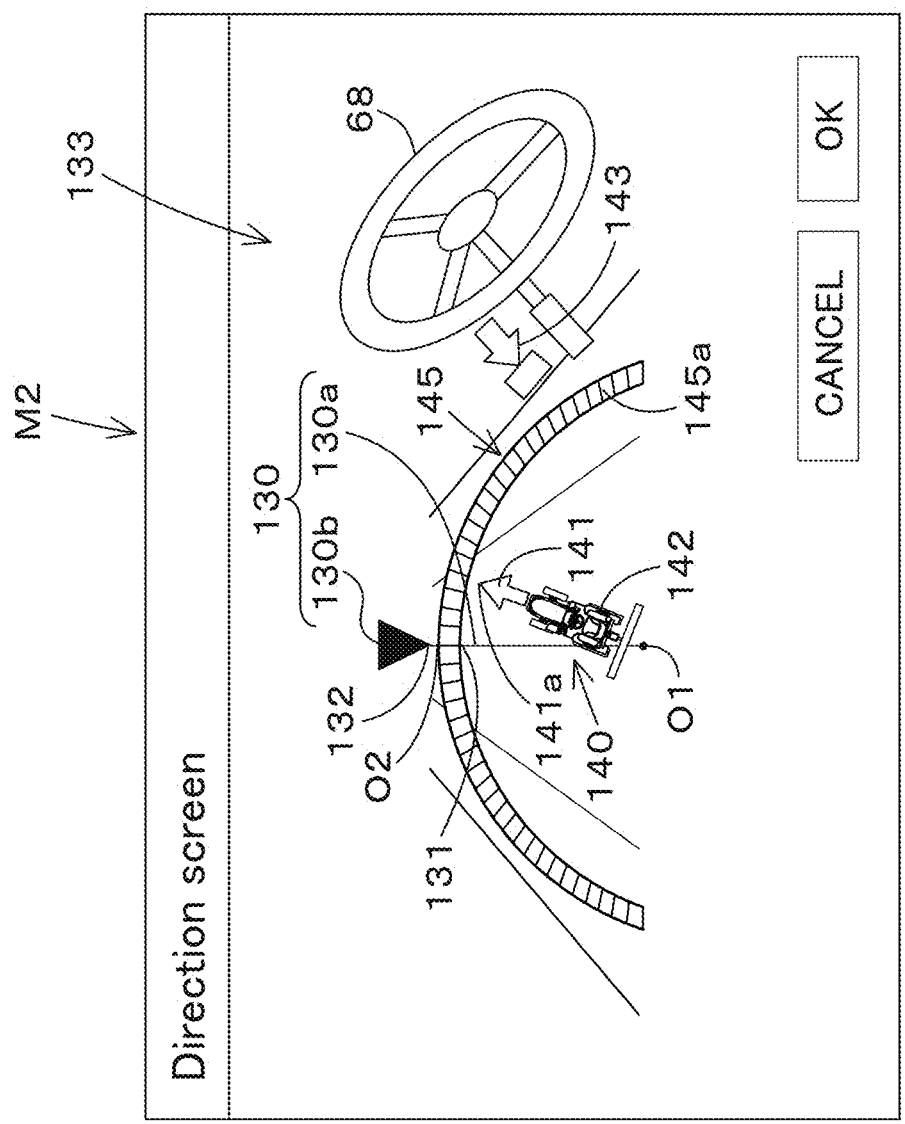
FIG. 21C is a view illustrating an orientation screen M2 in a case where a vehicle orientation F1 slightly offsets rightward with respect to a line orientation F2.

As shown in FIG. 21A, when the vehicle orientation F1 is in the same orientation as the line orientation F2, the tip portion 141*a* of the orientation indicator portion 141 and the end portion 131 of the mark portion 130*b* are opposite each other. Also, as shown in FIG. 21B, when the vehicle orientation F1 is displaced to the left with respect to the line orientation F2, the tip portion 141*a* of the orientation indicator portion 141 is located to the left of the line display portion 130*a*. As shown in FIG. 21C, when the vehicle orientation F1 is displaced to the right with respect to the line orientation F2, the tip portion 141*a* of the orientation indicator portion 141 is located to the right of the line display portion 130*a*.

According to the above configuration, by checking the relative position of the tip of the orientation indicator portion 141*a* and the mark portion 130*b* or the line display portion 130*a*, the operator can determine the extent to which the vehicle orientation F1 deviates from the line orientation F2.

Figure 23:
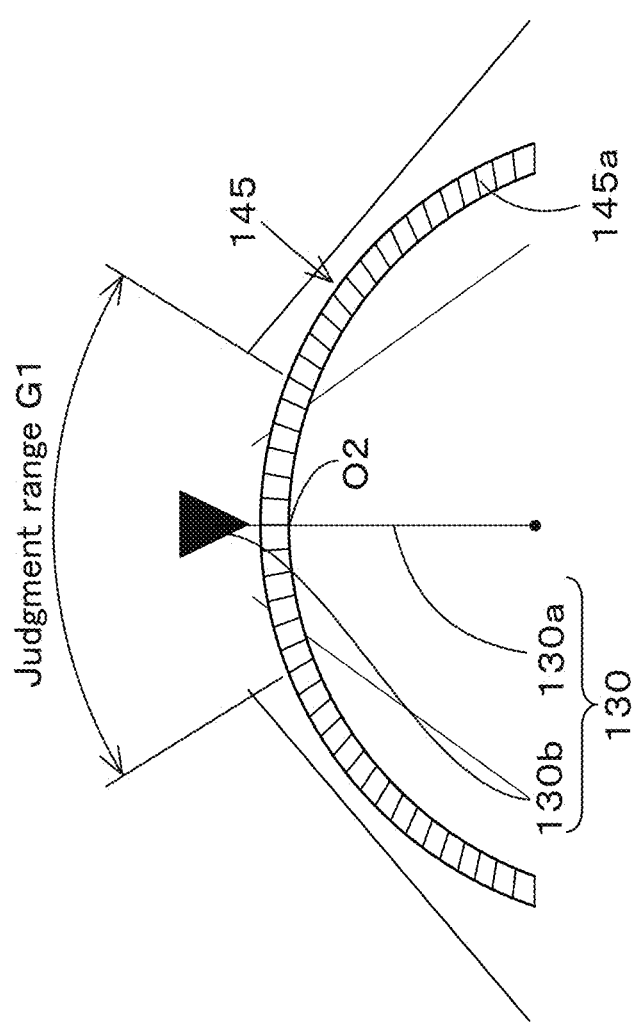
FIG. 23 is a view illustrating details of a scale portion.

As shown in FIG. 20, an orientation scale portion 145 may be displayed on the orientation screen M2. The orientation scale portion 145 is a scale in which the line orientation F2 of the traveling reference line L1 is the reference point O2, and the orientational difference ΔF (a value indicating the orientation) increases or decreases according to the distance from the reference point O2. That is, the orientation scale portion 145 includes a semicircular shape with a scale line 145*a* assigned to the orientational difference ΔF at predetermined intervals along the circumference of the semicircular shape. At the reference point O2 of the orientation scale portion 145, the end portion 131 of the mark portion 130*b* is pointed to. In addition, as shown in FIG. 23, the orientation scale portion 145 shows a judgment range G1. That is, the plurality of scale lines 145*a* on the orientation scale portion 145 are colored with at least two colors separately, and the plurality of scale lines 145*a* near the reference point O2 are colored with a color indicating that the value is within the judgment range G1 (a color within the range), and the plurality of scale lines 145*a* at a distance from the reference point O2 are colored with a value out of the judgment range G1 (a color out of the range) to indicate that a value is out of the judgment range G1. As described above, when the judgment range G1 is changed in accordance with the inclination of the vehicle body 3, the plurality of scale lines 145*a* are colored to correspond to in-range and out-of-range of the changed judgment range G1.

Figure 22A:
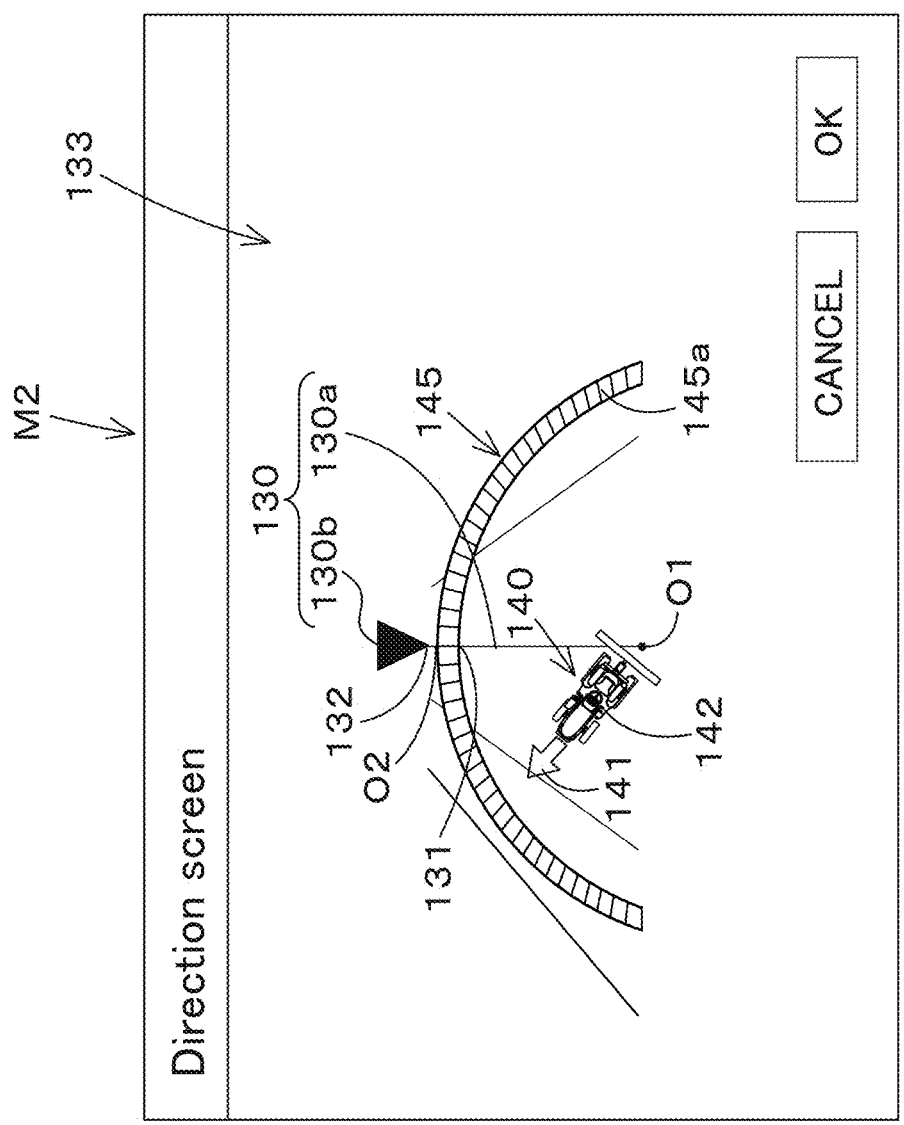
FIG. 22A is a view illustrating an orientation screen M2 in a case where a vehicle orientation F1 widely offsets leftward with respect to a line orientation F2.
Figure 22B:
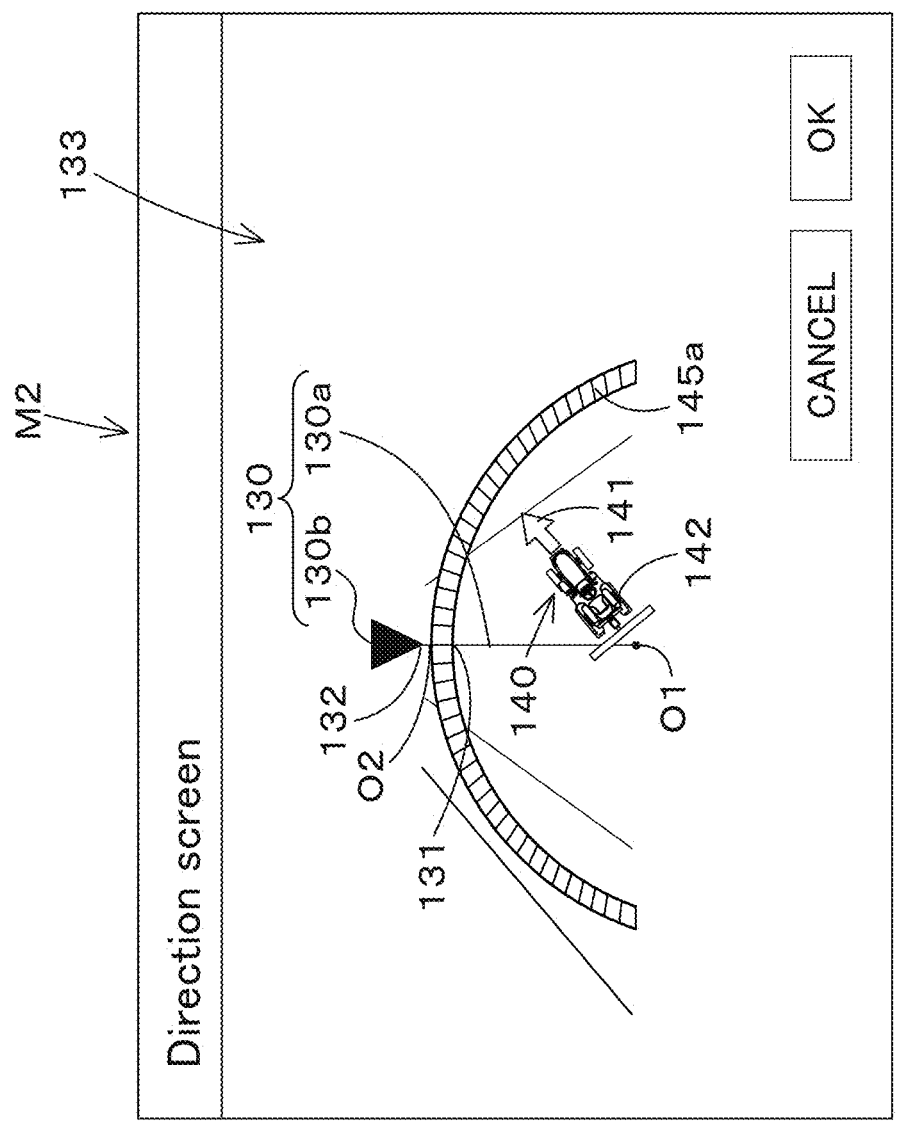
FIG. 22B is a view illustrating an orientation screen M2 in a case where a vehicle orientation F1 widely offsets rightward with respect to a line orientation F2.

The orientation indicator portion 141 is arranged inside the orientation scale portion 145 and points the vehicle orientation F1 to the orientation scale portion 145. The orientation indicator portion 141 has a different display configuration when the orientational difference ΔF between the line orientation F2 and the vehicle orientation F1 is within a predetermined range (within the judgment range G1) or when the orientational difference ΔF is out of the predetermined range (outside the judgment range G1). As shown in FIG. 21A to FIG. 21C, the orientation indicator portion 141 is colored the same color as the in-range color of the orientation scale portion 145 when the orientational difference ΔF is within the predetermined range (within the judgment range G1). As shown in FIGS. 22A and 22B, the orientation indicator portion 141 is colored the same color as the color out of range of the orientation scale portion 145 when the orientational difference ΔF is out of the predetermined range (out of the judgment range G1).

When the orientational difference ΔF is within a predetermined range, the display device 45 displays, on the orientation screen M2, a steering wheel display 68 showing a graphic of the steering wheel 30, and displays a graphic 143 indicating that the automatic steering can be started.

The working vehicle 1 includes the steering handle 30, the traveling body 3 configured to travel while undergoing the manual steering by the steering handle 30 or the automatic steering of the steering handle 30 based on the traveling reference line L1, the line orientation display portion 130 indicating the orientation F2 of the traveling reference line L1, and the display device 45 including the vehicle orientation display portion 140 indicating the orientation F1 of the vehicle body 3. According to this configuration, the display device 45 allows the user to easily determine which orientation the working vehicle 1 (vehicle body 3) is facing with respect to the orientation F2 of the traveling reference line L1.

The line orientation display portion 130 includes the line display portion 130*a* which indicates the traveling reference line L1, and the mark portion 130*b* which indicates the orientation F2 of the traveling reference line L1. According to this configuration, even when the operator is not able to know exactly what orientation the orientation F2 of the traveling reference line L1 is in a work field or other work area, the orientation F2 of the traveling reference line L1 can be easily ascertained by looking at the line display portion 130*a* and the mark portion 130*b* displayed on the display device 45.

The vehicle orientation display portion 140 includes the orientation indicator portion 141 which points to the orientation F1 of the vehicle body 3, and the vehicle body display portion 142 which shows the vehicle body 3 whose display position changes according to the orientation F1 of the vehicle body 3. Accordingly, even when the operator is not able to accurately determine the orientation F1 of the vehicle body 3 in the work field, the orientation F1 of the vehicle body 3 can be easily ascertained by looking at the orientation indicator portion 141 and the vehicle body display 142 displayed on the display device 45.

The display device 45 includes an orientation scale portion 145 which has the orientation F2 of the traveling reference line L1 as the reference point and whose value indicating the orientation increases or decreases depending on the distance from the reference point. The line orientation display portion 130 includes, in the reference point, the mark portion 130b indicating the orientation of the traveling reference line. According to this configuration, when looking at the scale portion 145, an operator can easily know which direction the orientation F2 of the traveling reference line L1 is with respect to the vehicle body 3.

The vehicle orientation display portion 140 includes the orientation indicator portion 141 that points to the orientation F1 of the vehicle body 3, and the orientation indicator portion 141 points the orientation F1 of the vehicle body 3 to the orientation scale portion 145. According to this configuration, the extent to which the orientation F1 of the vehicle body 3 is out of alignment with the traveling reference line L1 can be easily ascertained by looking at the orientation indicator portion 141 indicated on the orientation scale portion 145.

The vehicle orientation display 140 has different display formats alternately displayed when the orientational difference ΔF between the orientation F2 of the traveling reference line L1 and the orientation F1 of the vehicle body 3 is within a predetermined range and when the orientational difference ΔF is out of the predetermined range. This makes it easy for the operator to know whether or not the difference in the orientation ΔF is within the predetermined range.

The working vehicle includes the controller device 60B configured to permit the automatic steering when the orientation difference ΔF between the orientation F2 of the traveling reference line L1 and the orientation F1 of the vehicle body 3 is within a predetermined range. This makes it easy to switch the steering from the manual steering to the automatic steering.

Other configurations of the third preferred embodiment are configured in the same manner as in the first preferred embodiment.

A working vehicle includes a steering handle, a vehicle body to travel with either manual steering by the steering handle or automatic steering of the steering handle based on a traveling reference traveling line, and a display device including a line orientation display portion to indicate an orientation of the traveling reference line, and a vehicle orientation display portion to indicate an orientation of the vehicle body.

In the working vehicle mentioned above, the line orientation display portion includes a line display portion to indicate the traveling reference line, and a mark portion to indicate an orientation of the traveling reference line.

In the working vehicle mentioned above, the vehicle orientation display portion includes an orientation pointer portion to point an orientation of the vehicle body, and a vehicle display portion to display the vehicle body whose display position is changed based on the orientation of the vehicle body.

In the working vehicle mentioned above, the display device includes an orientation scale portion having a reference point that coincides with an orientation of the traveling reference line and being configured to increase and decrease a value indicating the orientation based on a distance from the reference point, and the line orientation display portion includes, at the reference point, a mark portion representing the orientation of the traveling reference line.

In the working vehicle mentioned above, the vehicle orientation display portion includes an orientation pointer portion to point an orientation of the vehicle body, and the orientation pointer points the orientation of the vehicle body on the orientation scale portion.

In the working vehicle mentioned above, the vehicle orientation display portion has a display format provided when an orientational difference between an orientation of the traveling reference line and an orientation of the vehicle body is within a predetermined range and another display format provided when the orientational difference is out of the predetermined range.

The working vehicle mentioned above includes a controller device to permit the automatic steering when an orientational difference between an orientation of the traveling reference line and an orientation of the vehicle body is within a predetermined range.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A working vehicle comprising:
a steering device including a steering handle;
a vehicle body to travel with either manual steering by the steering handle or automatic steering of the steering handle based on a scheduled traveling line, the scheduled traveling line being set based on a reference traveling line and not being associated with a length of the reference traveling line;
a steering angle detector device provided on the vehicle body to detect a steering angle of the steering device;
a controller to permit the automatic steering based on a plurality of steering angles of the steering device obtained when the vehicle body travels a predetermined distance while being steered by the manual steering; and
a steering switch to switch the automatic steering between to be started and to be terminated on the scheduled traveling line; wherein
the controller includes:
a steering angle obtainer to, in a turn section which is located forward of a position where the steering switch has been operated to terminate the automatic steering and in which each of steering angles detected by the steering angle detector device at one or more predetermined time intervals is larger than a turning judgment steering angle, not obtain the steering angles detected by the steering angle detector device as the plurality of steering angles, and to obtain, as the plurality of steering angles, steering angles detected by the steering angle detector device at one or more predetermined time intervals within a predetermined judging distance or a predetermined judging time from a position where the steering angle detected by the steering angle detector device has become equal to or less than the turning judgment steering angle;
a steering judgment circuit to judge whether a start of the automatic steering is permitted based on the plurality of steering angles obtained by the steering angle obtainer; and
an automatic steering controller to control the steering device to perform the automatic steering when the steering switch switches the automatic steering to be started under a condition where the steering judgment circuit determines that the start of the automatic steering is permitted.

2. The working vehicle according to claim 1, wherein
the steering judgment circuit finds a standard deviation and an average value of the plurality of steering angles;
the steering judgment circuit permits the start of the automatic steering when all of the plurality of steering angles are within a predetermined range determined based on the standard deviation; and
the steering judgment circuit does not permit the start of the automatic steering when one or more of the plurality of steering angles are in a region that exceeds the predetermined range determined based on the standard deviation.

3. The working vehicle according to claim 1, further comprising a display to display that the steering judgment circuit determines that the start of the automatic steering is permitted.

4. The working vehicle according to claim 1, wherein the steering judgment circuit determines that the start of the automatic steering is permitted when a variation of the plurality of steering angles is within a predetermined range.

5. The working vehicle according to claim 1, further comprising:
a position detector; and
a reference traveling line setter switch to set positions of the vehicle body detected by the position detector to a start position and an end position of the reference traveling line.

6. A working vehicle comprising:
a steering device to change an orientation of a vehicle body;
an inclination detector to detect an inclination of the vehicle body;
a steering angle calculator to calculate a steering angle of the steering device to reduce a deviation between a scheduled traveling line and the vehicle body based on the deviation and a predetermined parameter;
a steering controller to control the steering device based on the steering angle calculated by the steering angle calculator; and
a parameter corrector to correct the predetermined parameter used by the steering angle calculator based on the inclination of the vehicle body detected by the inclination detector.

7. The working vehicle according to claim 6, wherein the parameter corrector corrects the predetermined parameter when the inclination of the vehicle body detected by the inclination detector is a value other than a predetermined value.

8. The working vehicle according to claim 6, wherein the parameter corrector corrects the predetermined parameter to increase the steering angle when the inclination of the vehicle body obtained by the inclination detector represents an uphill direction, and corrects the predetermined parameter to decrease the steering angle when the inclination of the vehicle body represents a downhill direction.

9. The working vehicle according to claim 6, wherein the parameter corrector increases a correction degree of the parameter as the inclination of the vehicle body obtained by the inclination detector increases.

10. The working vehicle according to claim 6, wherein the parameter corrector corrects the predetermined parameter serving as a control gain used to calculate the steering angle of the steering device.

11. A working vehicle comprising:
a steering device including a steering handle;
a vehicle body to travel with either manual steering by the steering handle or automatic steering of the steering handle based on a reference traveling line;
a position detector to detect an orientation of the vehicle body;
an inclination detector to detect an inclination of the vehicle body; and
a controller to permit the automatic steering when a difference between an orientation of the reference traveling line and an orientation of the vehicle body detected by the position detector is within a judgment range, and perform the automatic steering by the steering device when the automatic steering is performed; wherein
the controller changes the judgment range depending on the inclination of the vehicle body detected by the inclination detector.

12. The working vehicle according to claim 11, wherein the controller changes a lower limit of the judgment range based on the inclination of the vehicle body when the vehicle body is inclined such that one side of the vehicle body in a width direction is higher than the other side.

13. The working vehicle according to claim 12, wherein the controller decreases an upper limit of the judgment range such that the upper limit is less than an upper limit of a predetermined standard range.

14. The working vehicle according to claim 11, wherein the controller changes the upper limit of the judgment range depending on the inclination of the vehicle body when the vehicle body is inclined such that one side of the vehicle body in a width direction is lower than the other side.

15. The working vehicle according to claim 14, wherein the controller decreases a lower limit of the judgment range such that the lower limit is less than a lower limit of a predetermined standard range.

16. The working vehicle according to claim 11, further comprising:
a steering switch to switch the automatic steering between to be started and to be terminated; wherein
the controller starts the automatic steering by the steering device when the steering switch switches the automatic steering to be started under a condition where the automatic steering is permitted.

17. The working vehicle according to claim 11, further comprising a display to display that an orientational difference between an orientation of the reference traveling line and an orientation of the vehicle body detected by the position detector is within the judgment range.

18. The working vehicle according to claim 11, further comprising a reference traveling line setter switch to set positions of the vehicle body detected by the position detector to a start position and an end position of the reference traveling line.

* * * * *